United States Patent
Tsuda et al.

(10) Patent No.: US 8,249,339 B2
(45) Date of Patent: Aug. 21, 2012

(54) IMAGE PROCESSING DEVICE AND ELECTRONIC CAMERA

(75) Inventors: Yutaka Tsuda, Yokohama (JP); Kazuhiro Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 857 days.

(21) Appl. No.: 12/309,741

(22) PCT Filed: Jul. 30, 2007

(86) PCT No.: PCT/JP2007/000808
§ 371 (c)(1), (2), (4) Date: Feb. 17, 2009

(87) PCT Pub. No.: WO2008/015781
PCT Pub. Date: Feb. 7, 2008

(65) Prior Publication Data
US 2009/0274365 A1    Nov. 5, 2009

(30) Foreign Application Priority Data

Aug. 1, 2006 (JP) ................ 2006-209476
Feb. 6, 2007 (JP) ................ 2007-026574
Jul. 24, 2007 (JP) ................ 2007-192284

(51) Int. Cl.
G06K 9/00 (2006.01)
(52) U.S. Cl. .......................................... 382/166
(58) Field of Classification Search ............. 382/232, 382/236, 248, 304–305; 358/1.9, 426.05; 348/441, 443; 386/328–329; 375/240.1
See application file for complete search history.

(56) References Cited

U.S. PATENT DOCUMENTS

| 5,568,278 | A | 10/1996 | Nakano et al. |
| 6,990,240 | B2 * | 1/2006 | Hagiwara ............ 382/232 |
| 7,286,717 | B2 * | 10/2007 | Nomizu ............... 382/280 |
| 7,408,587 | B2 * | 8/2008 | Matsutani et al. ....... 348/441 |
| 7,573,504 | B2 * | 8/2009 | Takane ............... 348/220.1 |
| 7,671,913 | B2 * | 3/2010 | Kume et al. ........... 348/305 |
| 2002/0001410 | A1 | 1/2002 | Hagiwara |
| 2004/0109679 | A1 | 6/2004 | Watanabe et al. |

(Continued)

FOREIGN PATENT DOCUMENTS
EP    1 542 474 A1    6/2005
(Continued)

OTHER PUBLICATIONS

Illgner, "DSPs for image and video processing," *Signal Processing*, vol. 80, 2000, pp. 2323-2336.

(Continued)

*Primary Examiner* — Jose Couso
(74) *Attorney, Agent, or Firm* — Oliff & Berridge, PLC

(57) ABSTRACT

An image processing device includes an interpolation color processing circuit receiving images of continuous frames to perform interpolation and color processing thereon, a storage part cyclically storing a plurality of frames of images being processed and having been processed by the interpolation color processing circuit, a plurality of image compression processing circuits reading the images of frames processed by the interpolation color processing circuit to perform image compression processing on the images and being cyclically started up for each of frames to perform parallel processing, and a compression data storage part storing compression data processed by the image compression processing circuit. The image processing device can solve a problem of a prior art in that long processing time is required because image compression processing is heavier than interpolation processing and color processing.

17 Claims, 22 Drawing Sheets

U.S. PATENT DOCUMENTS

2005/0046707 A1    3/2005    Takane

FOREIGN PATENT DOCUMENTS

| | | |
|---|---|---|
| JP | A-05-143720 | 6/1993 |
| JP | A-05-227519 | 9/1993 |
| JP | A-09-219807 | 8/1997 |
| JP | A-09-294268 | 11/1997 |
| JP | A-2000-004365 | 1/2000 |
| JP | A-2001-061148 | 3/2001 |
| JP | A-2002-016870 | 1/2002 |
| JP | A-2002-084493 | 3/2002 |
| JP | A-2004-186978 | 7/2004 |
| JP | A-2005-332298 | 12/2005 |

OTHER PUBLICATIONS

Monnes et al., "Parallel JPEG Algorithms for Still Image Compression," *IEEE*, 1994, pp. 375-379.

European Search Report issued in European Patent Application No. 07790302.9 dated Jul. 29, 2011.

\* cited by examiner

IMAGE PROCESSING DEVICE AND ELECTRONIC CAMERA

CROSS-REFERENCE TO THE RELATED APPLICATIONS

This application is a U.S. National Stage application claiming the benefit of the prior filed International Application Number PCT/JP2007/000808, filed Jul. 30, 2007, in which the International Application claims priorities from Japanese Application Numbers 2006-209476 (filed on Aug. 1, 2006), 2007-026574 (filed on Feb. 6, 2007), and 2007-192284 (filed on Jul. 24, 2007), the entire contents of which are incorporated herein by reference.

TECHNICAL FIELD

The present invention relates to an image processing technology for carrying out image compression.

BACKGROUND ART

Generally, a procedure for performing image processing on an image shot by a camera etc. and storing the processed image on a storage medium is, first perform interpolation processing or color processing on the shot image, and then perform image compression processing on the processed image to store the compressed image on a storage medium. However, since processing speeds of respective parts are different from each other, there has been a problem in that the entire processing speed is determined by slower processing.

For this reason, in order to improve the entire processing speed, various technologies have been considered such as a method taking two types of signals from an image sensor, and performing parallel processing on the signals (refer to, for example, Patent Document 1).

Moreover, a code amount at performing compression processing on a shot image differs depending on the types of the image. For example, in a generally used JPEG type of image compression processing, if image compression is performed using an equal scaling factor (that is a compression parameter to be multiplied by a quantization table so that the quantization bit number may be variable), an image having larger high frequency elements will have a larger code amount, and an image having smaller high frequency elements will have a smaller code amount.

If carrying out such variable-length compression, for an electronic camera having a constant memory size, a problem will arise, in that the number of shootable frames differs depending on a shooting image, which makes it impossible to know remaining number of shootable frames.

Thus, as compression processing in an image processing device, in a point of view to easily know the number of remaining frames, in many cases, a fixed length compression is adopted in which adjusting the scaling factor makes one frame amount of compression data substantially constant. In addition, Patent Document 2 discloses an example of configuration of an electronic camera for performing fixed length compression processing.

Moreover, a fixed length compression is also adopted which predicts and adjusts the scaling factor so that the code amount after image compression falls within a predetermined range (for example, refer to Patent Document 3).

Patent Document 1: Japanese Unexamined Patent Application Publication No. 2002-84493
Patent Document 2: Japanese Unexamined Patent Application Publication No. H09-219807
Patent Document 3: Japanese Unexamined Patent Application Publication No. 2001-61148

DISCLOSURE

Problems to be Solved

Prior art has a problem in that processing time becomes long because image compression processing is heavier than interpolation processing or color processing. Moreover, a method for taking out two types of signals from an image sensor has a problem in that the cost of an image processing device becomes high because a dedicated image sensor is necessary. Further, prediction of a scaling factor and updating timing of the scaling factor, so that that the code amount after image compression may fall within a predetermined range, have not been investigated in detail.

As mentioned above, in a point of view to improve the continuous shooting speed of an image-shooting device or to improve the image processing speed, a higher speed of compression processing with respect to image data is still required.

In view of the above-mentioned problems, a proposition of the present invention is to provide an image processing device and an electronic camera which can perform compression processing on image data more rapidly and improve the entire processing speed, at a low cost.

Means for Solving the Problems

An image processing device according to the present invention includes an interpolation color processing circuit receiving images of continuous frames to perform interpolation and color processing thereon, a storage part cyclically storing images of a plurality of frames being processed or having been processed by the interpolation color processing circuit, a plurality of image compression processing circuits reading images of frames having been processed by the interpolation color processing circuit from the storage part to perform image compression processing thereon and being cyclically started up for each of the frames to perform parallel processing thereon, and a compression data storage part storing compression data processed by the image compression processing circuits.

Specifically, the number of the image compression processing circuits is set equal to or greater than a round-up number of a calculation value of the following expression: (processing time of the image compression processing circuit to one frame)/(processing time of the interpolation color processing circuit to one frame)

Alternately, an image processing device according to the present invention includes an interpolation color processing circuit receiving images of continuous frames to perform interpolation and color processing thereon, a plurality of storage buffers storing a predetermined amount of data set in advance from the frames being processed by the interpolation color processing circuit for each of the frames, a plurality of image compression processing circuits reading processed data stored in the storage buffers for each image processing unit to perform image compression processing thereon and being cyclically started up each time when a first unit of the image processing units of the frame is read to perform parallel processing thereon, and a compression data storage part storing compression data processed by the image compression processing circuit.

Specifically, the number of the image compression processing circuits is set equal to or greater than a round-up number of a calculation value of the following expression:

{(processing time of the image compression processing circuit for one frame)−(processing time of the processing unit data of the interpolation color processing circuit)}/(processing time of the interpolation color processing circuit for one frame)

Alternately, an image processing device according to the present invention includes an interpolation color processing circuit receiving images of continuous frames to perform interpolation and color processing thereon, a plurality of storage buffers cyclically storing a predetermined amount of data set in advance from the frames being processed by the interpolation color processing circuit for each of the predetermined amount, a plurality of image compression processing circuits reading processed data stored in the storage buffers for each image processing unit to perform image compression processing thereon and being cyclically started up for each of the predetermined amount to perform parallel processing on an image of a same frame a data alignment part aligning an order of compression data for each of a plurality of image processing units processed by the plurality of the image compression processing circuits, and a compression data storage part storing compression data of one frame, the order of the compression data being aligned by the data alignment part.

Moreover, the image processing device configuring the plurality of the image compression processing circuits with a first image compression processing part performing image compression processing on images of odd order frames of the continuous frames and a second image compression processing part performing image compression processing on images of even order frames of the continuous frames, the image processing device further includes a compression condition storage part storing at least one of a first compression condition used for image compression processing in the first image compression processing part and a second compression condition used for image compression processing in the second image compression part, and a compression control part controlling image compression processing of the first image compression processing part and the second image compression processing part and compression condition storage processing in the compression condition storage part.

Specifically, the compression control part sequentially updates and stores latest compression condition of the first and the second compression conditions in the compression condition storage part, sets the first compression condition used for image compression processing on a next frame in the first image compression processing part with reference to the latest compression condition stored in the compression condition storage part, and sets the second compression condition used for image compression processing on a next frame in the second image compression processing part with reference to the latest compression condition stored in the compression condition storage part.

Alternately, the compression control part stores the respective first and second compression conditions in the compression condition storage part separately, updates and sets the first compression condition used for image compression processing on a next frame in the first image compression processing part with reference to the first compression condition of a former frame stored in the compression condition storage part, and updates and sets the second compression condition used for image compression processing on a next frame in the second image compression processing part with reference to the second compression condition of a former frame stored in the compression condition storage part.

Moreover, the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and when the second image compression processing part performs image compression processing on a second frame image of the continuous frame images, controls the second image compression processing part so as to perform preliminary compression processing on the second frame image by using a predetermined initial compression condition, to set the second compression condition based on an amount of compression codes obtained from the result of the preliminary compression processing so that a final amount of the compression codes falls within a predetermined range, and to perform compression processing on the second frame image by using the set second compression condition.

Alternately, the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and when the second image compression processing part performs image compression processing on a second frame image of the continuous frame images, controls the second image compression processing part so as to set the second compression condition based on an amount of compression codes obtained from the result of the preliminary compression processing on the first frame image so that a final amount of the compression codes falls within a predetermined range, and to perform compression processing on the second frame image by using the set second compression condition.

Moreover, an image processing device according to the present invention includes a storage part storing a frame image having a first resolution and a reduced image having a second resolution smaller than the first resolution in a same frame as that of the frame image, a plurality of image compression processing circuits reading the frame image and the reduced image stored in the storage part to perform image compression processing thereon, and a compression control part controlling the plurality of the image compression processing circuits so that while one part of the plurality of the image compression processing circuits performs image compression processing on the frame image, the other part of the plurality of the image compression processing circuits performs image compression processing on the reduced image in parallel.

Moreover, an image processing device according to the present invention includes a first compression processing part compressing data of an input image to generate first compression data, a second compression processing part compressing data of an input image to generate second compression data, and a control part dividing each of the input image of one frame into two areas and causing the first and second compression processing parts to perform parallel processing on the divided image data, respectively.

Furthermore, the image processing device further includes a memory storing data temporarily, and a data transferring part storing the first and the second compression data in a common storing area allocated for one frame in the memory.

In particular, the data transferring part stores the first compression data in the storing area from a start address thereof in a forward direction, and stores the second compression data in the storing area from an end address thereof in a reverse direction.

Alternately, the data transferring part reverses an alignment order of the second compression data to store the second compression data in the storing area.

Furthermore, the control part, based on a result of compression of the first and the second compression processing parts, calculates a parameter at a time of re-compression.

Moreover, an electronic camera according to the present invention includes the image processing device, and an image-shooting part shooting an image object to output images of continuous frames.

According to the present invention, an image processing speed can be improved by performing parallel processing on images using a plurality of image compression processing circuits.

DETAILED DESCRIPTION OF THE EMBODIMENTS

Figure 1:
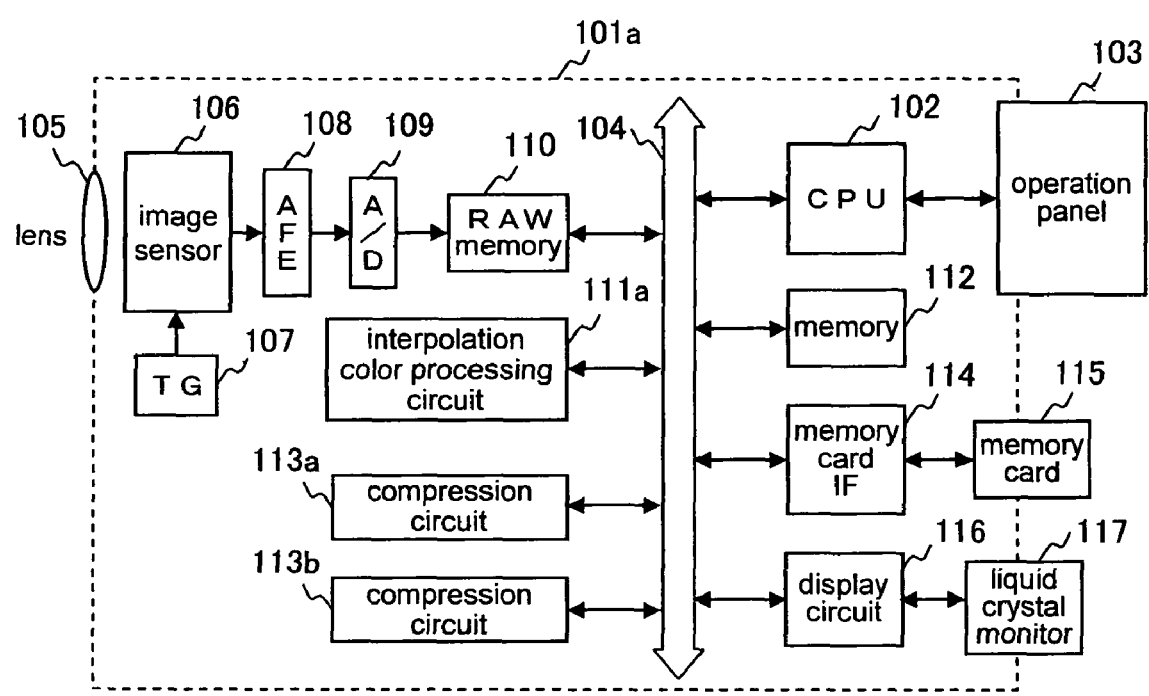
FIG. 1 is an entire block diagram of an image processing device according to a first embodiment.

Hereinafter, with reference to appended drawings, a camera having an image processing device according to the present invention will be described. However, before describing embodiments, with reference to FIG. 20, a camera 151 having an image processing device of prior art will be described first so that the aspects of the present invention will be clear.

The camera 151 operates by a program stored on a CPU 102 in advance and controls parts of the camera 151 through a system bus 104 based on user's operation through an operation panel 103.

An object light incident from a lens 105 forms an image on an image sensor 106 and the light is converted into an electric signal based on timing of a timing generator (TG) 107. An analog signal converted into the electric signal is subjected to noise removal and is amplified at an analog front end (AFE) 108, and converted into digital image data by an analog digital conversion part (A/D) 109. The digital image data is stored in a RAW memory 110 as raw data (RAW data) of an image temporarily.

An interpolation color processing circuit 111 reads the RAW data from the RAW memory 110, performs interpolation processing and conversion processing from RGB data into brightness color difference (YCrCb) data, and stores the data on a memory 112 temporarily.

A compression circuit 113 reads the YCrCb data from the memory 112, and performs image compression processing on the data. The image compression data generated by the compression circuit 113, in response to instruction or setting of a user through the operation panel 103, is stored in a memory card 115 coupled to the circuit 113 through a memory card IF 114. In addition, inputs/outputs of data among the RAW memory 110, the memory 112, the interpolation color processing circuit 111, and the compression circuit 113, are carried out through the system bus 104, and controlled by the CPU 102.

Figure 21:
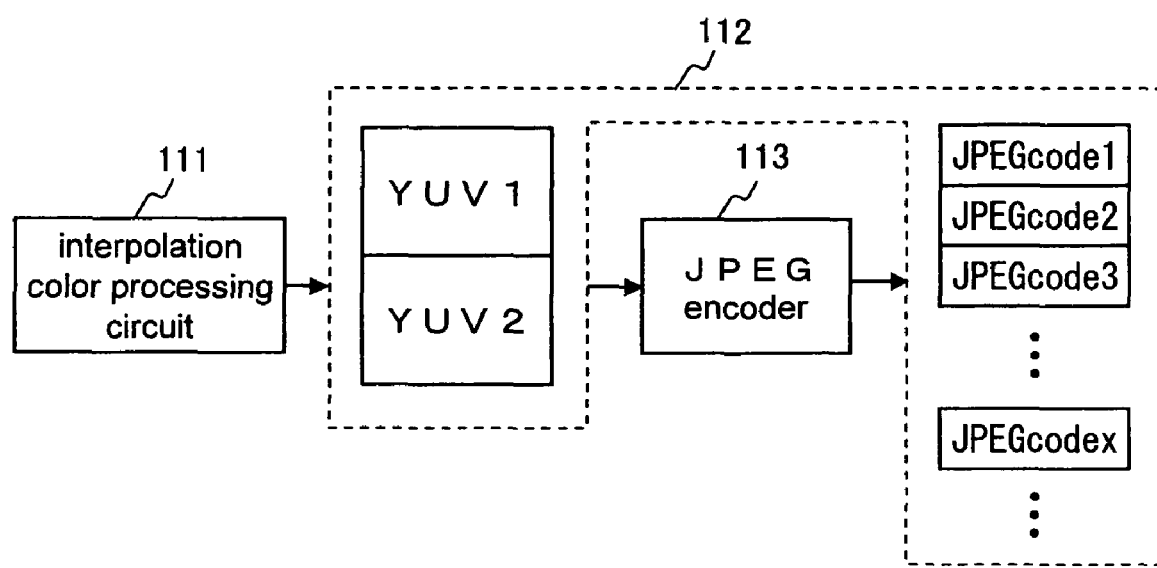
FIG. 21 is a block diagram of a conventional image processing part.

Next, with reference to FIG. 21, the series of operations will be described. Here, the compression circuit 113 will be described as a JPEG encoder 113, performing image compression processing in accordance with JPEG standard. In FIG. 21, the YCrCb data which is subjected to interpolation color processing by the interpolation color processing circuit 111, is alternately stored in storage areas YUV1 and YUV2 for two frames provided at the memory 112. Note that, the CPU 102 reads the YCrCb data stored in the memory 112, and displays the shot image on a liquid crystal monitor 117 via a display circuit 116.

The JPEG encoder 113 reads the YCrCb data which has been subjected to interpolation color processing, from the memory 112, and performs image compression processing on the data. At that time, the encoder 113 reads the YCrCb data which is stored in storage areas YUV1 and YUV2 for the two frames, alternately, and has been subjected to interpolation color processing, performs image compression processing on the read data, and stores each one frame of generated JPEG codes in image compression data storage areas of the memory 112 in a sequential order. For example, in FIG. 21, image compression data is stored such that a first frame is JPEG-code1, a second frame is JPEGcode2, a third frame is JPEG-code3, and an x-th frame is JPEGcodex.

Figure 22:
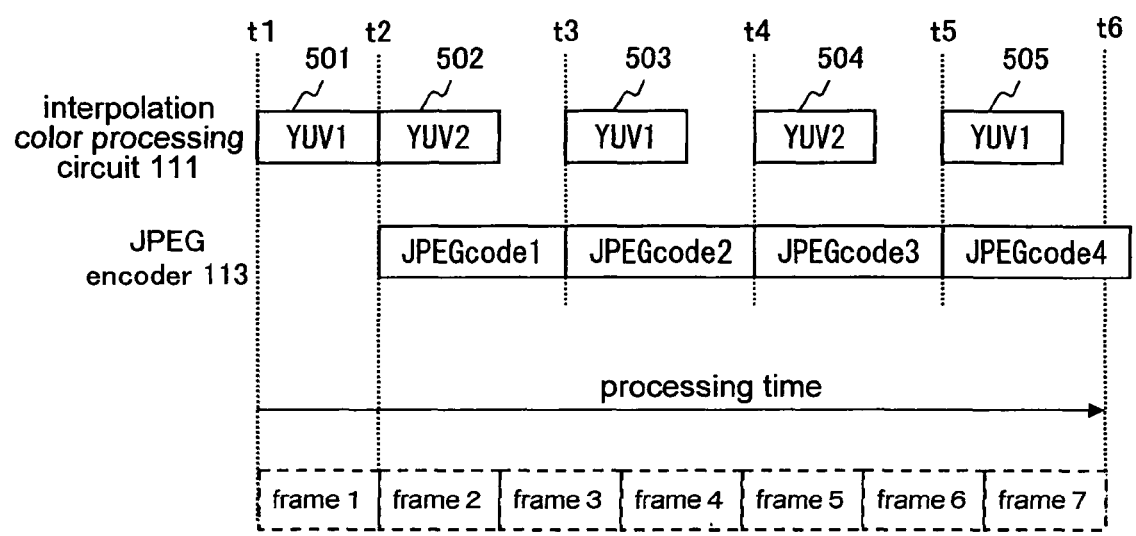
FIG. 22 is an explanatory diagram illustrating the order of conventional image processing.

Next, with reference to FIG. 22, relationship between the above-mentioned processing and time will be described. FIG. 22 illustrates relationship of the processing times between the interpolation color processing circuit 111 and the JPEG encoder 113.

Incidentally, in general, since time required for the interpolation color processing is longer than that required for the image compression processing, the image compression processing becomes a bottleneck, and determines the entire processing time. FIG. 22 assumes that the time required for the image compression processing is about 1.5 times that required for the interpolation color processing.

Time from the timing t1 to the timing t6 is time required for the interpolation color processing circuit 111 to perform processing on seven image frames continuously. The interpolation color processing circuit 111 starts interpolation color processing on image data of a frame 501 at the timing t1, and completes the processing at the timing t6. In other words, at the timing t2, storing of the processed YCrCb data in the storage area YUV1 of the memory 112 in FIG. 21 is finished, and the processing of the frame 501 is finished.

Next, at the timing t2 that is timing when processing of the frame 501 is finished, the interpolation color processing circuit 111 starts interpolation color processing of a next frame 502. At the same time, the JPEG encoder 113 reads the YCrCb data of the frame 501 which is stored in the storage area YUV1 and has been subjected to interpolation color processing, and starts image compression processing in accordance with JPEG standard.

Meanwhile, as described above, since the time required for the image compression processing is about 1.5 times that required for the interpolation color processing, the interpolation color processing of the frame 502 finishes first. Since, at that time, the JPEG encoder 113 is performing image compression processing on the frame 501 stored in the storage area YUV1, the interpolation color processing circuit 111 cannot use the storage area YUV1. At timing t3, the JPEG encoder 113 finishes the image compression processing of the frame 501, and completes generation of JPEGcode1. At that time, the storage area YUV1 becomes usable, the interpolation color processing circuit 111 starts interpolation color processing of a next frame 503, and writes the processed YCrCb data in the storage area YUV1. At the same time, the JPEG encoder 113 reads the YCrCb data of the frame 502 which is stored in the storage area YUV2 and has been subjected to interpolation color processing, and starts image compression processing of the YCrCb data.

However, in a manner similar to the case of the frame 502, since the time required for the image compression processing is about 1.5 times that required for the interpolation color processing, the interpolation color processing of the frame 503 finishes first. Since, at that time, the JPEG encoder 113 is performing image compression processing on the frame 502 stored on the storage area YUV2, the interpolation color processing circuit 111 cannot use the storage area YUV2. Therefore, at the timing t4 when the JPEG encoder 113 finishes image compression processing of the frame 502, the interpolation color processing circuit 111 starts interpolation color processing of a next frame 504, and writes the processed YCrCb data in the storage area YUV2. At the same time, the JPEG encoder 113 reads the YCrCb data of the frame 503 which is stored in the storage area YUV1 and has been subjected to interpolation color processing, and starts image compression processing of the YCrCb data.

Similarly, at the timing t5 when the JPEG encoder 113 finishes the image compression processing of the frame 503, the interpolation color processing circuit 111 starts interpolation color processing of a next frame 505, and writes the processed YCrCb data in the storage area YUV1. At the same time, the JPEG encoder 113 reads the YCrCb data of the frame 504 which is stored in the storage area YUV2 and has been subjected to interpolation color processing, and starts image compression processing of the YCrCb data.

As mentioned above, the configuration of FIG. 20 can process only five frames 501 to 505 within processing time, which can perform interpolation color processing on seven frames 1 to 7 indicated by dotted lines, if the interpolation color processing circuit 111 processes the frames continuously.

Next, embodiments according to the present invention for solving the above mentioned problems will be described in turn.

(First Embodiment)

FIG. 1 is a block diagram illustrating a configuration of a camera 101a having an image processing device according to a first embodiment. The camera 101a has the same basic configuration as that of the above-described camera 151 in FIG. 20, and operates by a program stored on a CPU 102 in advance. The CPU 102, based on user's operation via an operation panel 103, controls parts of the camera 101a through a system bus 104. Here, only the portion different from FIG. 20 will de described.

Figure 20:
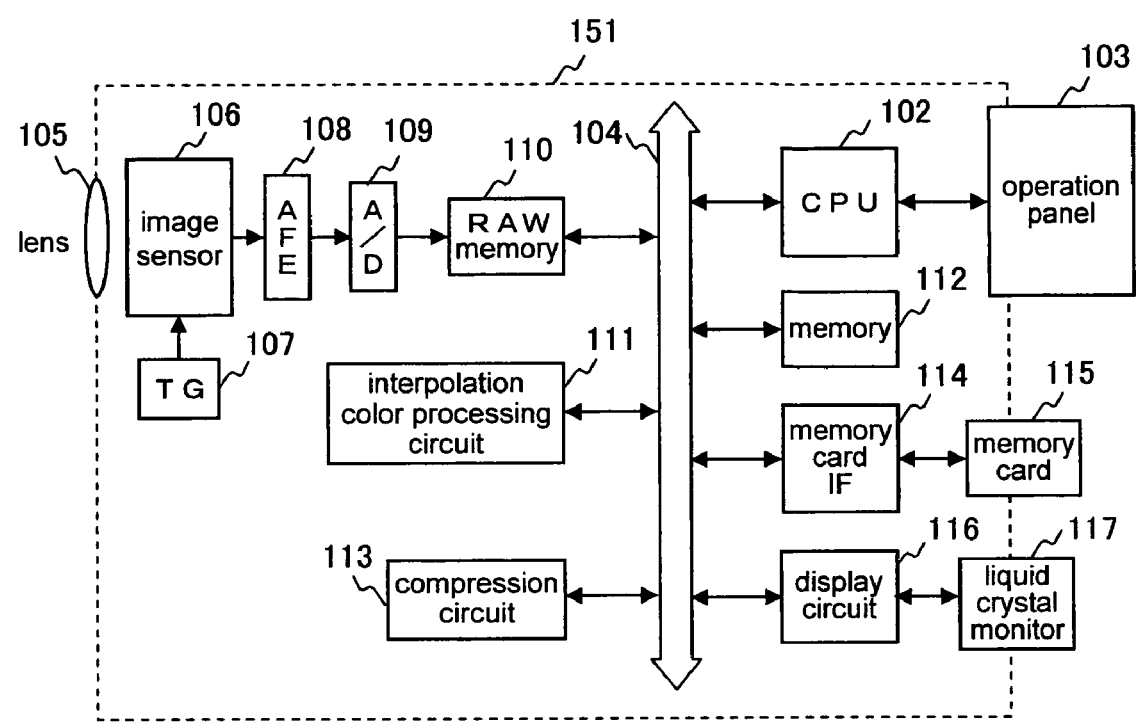
FIG. 20 is an entire block diagram of a conventional image processing device.

The portion different from FIG. 20 is that compression circuits 113a and 113b being equivalent to the compression circuit 113 are provided, and operations up to a step in which object light incident from a lens 105 is converted into an electric signal by an image sensor 106, and digital image data shot through an AFE 108 and an A/D 109 is stored on a RAW memory 110, are the same as those in FIG. 20.

Figure 2:
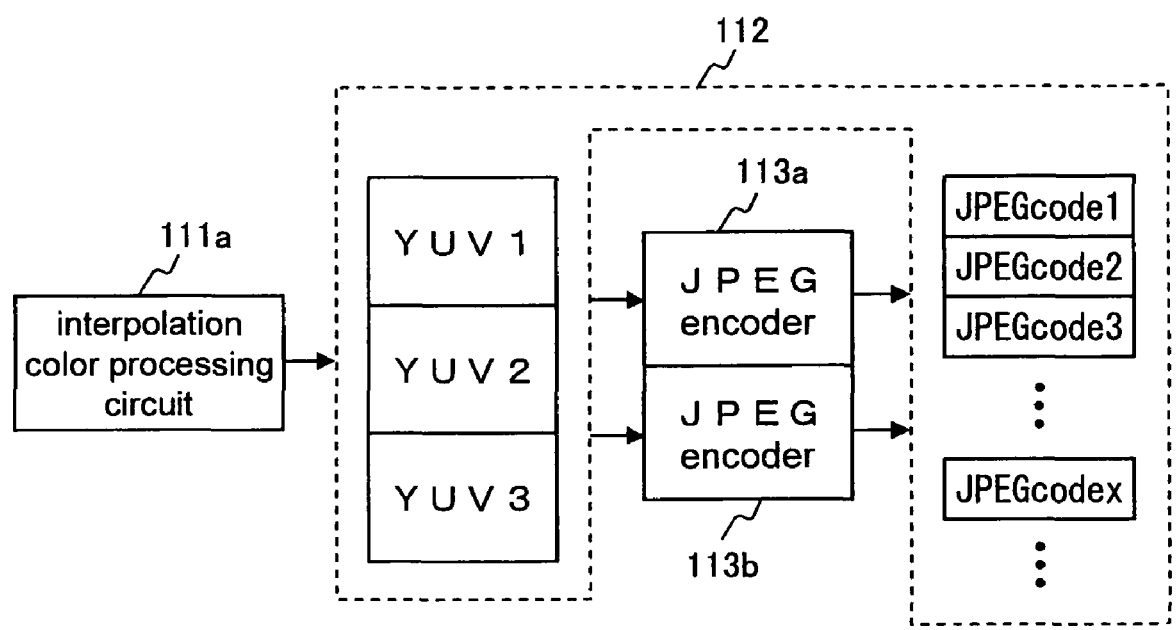
FIG. 2 is a block diagram of an image processing part of the image processing device according to the first embodiment.

Moreover, in a manner similar to the interpolation color processing circuit 111 in FIG. 20, an interpolation color processing circuit 111a reads RAW data from a RAW memory 110, performs interpolation processing and conversion processing from RGB data into brightness color difference (YCrCb) data, and stores the converted data in a memory 112 temporarily. However, the way to store the data in the memory 112 is different. This situation is illustrated in FIG. 2. Note that, here, the compression circuits 113a and 113b will be described as JPEG encoders 113a and 113b which perform image compression processing in accordance with JPEG standard. The YCrCb data which has been subjected to interpolation color processing is cyclically stored in storage areas YUV1, YUV2 and YUV3 for three frames provided at the memory 112.

The JPEG encoders 113a and 113b read the YCrCb data which has been subjected to interpolation color processing, from the memory 112, alternately, and perform image compression processing on the data in accordance with JPEG standard. At that time, the encoders 113a and 113b cyclically read the YCrCb data which has been subjected to interpolation color processing, from the storage areas YUV1, YUV2 and YUV3 for three frames, and perform image compression processing on the data. For example, if the interpolation color processing circuit 111a finishes storing the processed data in the storage area YUV1, the JPEG encoder 113a reads the YCrCb data from the storage area YUV1 and performs image compression processing on the data. Next, if the interpolation color processing circuit 111a finishes storing the processed data in the storage area YUV2, the JPEG encoder 113b reads the YCrCb data from the storage area YUV2 and performs image compression processing on the data. Furthermore, if the interpolation color processing circuit 111a finishes storing the processed data in the storage area YUV3, the JPEG encoder 113a reads the YCrCb data from the storage area YUV3 and performs image compression processing on the data. In this manner, the interpolation color processing circuit 111a cyclically writes the processed YCrCb data in the storage areas YUV1, YUV2 and YUV3, and, at the same time, the JPEG encoders 113a and 113b read the YCrCb data from processed storage areas among the storage areas YUV1, YUV2 and YUV3, and perform image compression processing on the data.

The image compression data alternately generated by the JPEG encoders 113a and 113b are stored in the image compression data storage areas of the memory 112, for example, such that a first frame is JPEGcode1, a second frame is JPEGcode2, a third frame is JPEGcode3, and x-th frame is JPEGcodex.

Figure 3:
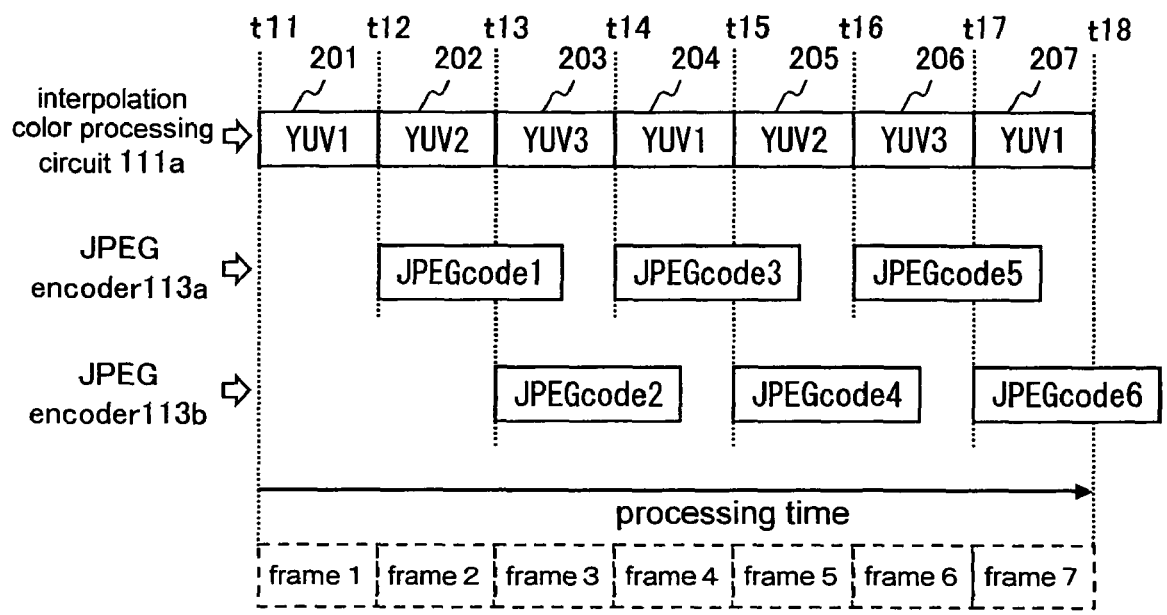
FIG. 3 is an explanatory diagram illustrating the order of image processing of the image processing device according to the first embodiment.

Next, with reference to FIG. 3, relationship between the above-mentioned processing and time will be described. FIG. 3 describes relationship of the processing time between the interpolation color processing circuit 111a and the JPEG encoders 113a and 113b. In this case, in order to compare with the case of FIG. 22, it is also supposed that the time required for the image compression processing is about 1.5 times that of the interpolation color processing, and, time from the timing t1 to the timing t6 in FIG. 22 corresponds to time from the timing t11 to the timing t18 in FIG. 3 that is processing time when the interpolation color processing circuit 111a processes seven image frames continuously.

The interpolation color processing circuit 111a starts interpolation color processing on image data of a frame 201 at the timing t11, and finishes the interpolation color processing at the timing t12. In other words, at the timing t12, storing of the processed YCrCb data on the storage area YUV1 of the memory 112 in FIG. 2 is finished, and the processing of the frame 201 is finished.

Next, at the timing t12 that is timing when processing of the frame 201 is finished, the interpolation color processing circuit 111a starts interpolation color processing of a next frame 202. At the same time, the JPEG encoder 113a reads the YCrCb data of the frame 201 which is stored in the storage area YUV1 and has been subjected to interpolation color processing, and starts image compression processing.

Next, at the timing t13 that is timing when processing of the frame 202 is finished, the interpolation color processing circuit 111a starts interpolation color processing of a next frame 203. At the same time, the JPEG encoder 113a reads the YCrCb data of the frame 202 which is stored in the storage area YUV2 and has been subjected to interpolation color processing, and starts image compression processing.

In a similar manner, at the timing t14, the interpolation color processing circuit 111a starts interpolation color processing of a next frame 204, and the JPEG encoder 113a starts image compression processing of the frame 203 which is stored on the storage area YUV3 and has been subjected to interpolation color processing.

Subsequently, at the timing t15, the interpolation color processing circuit 111a starts interpolation color processing of a next frame 205, and the JPEG encoder 113b starts image compression processing of the frame 204 which has been subjected to interpolation color processing. At the timing t16, the interpolation color processing circuit 111a starts interpolation color processing of a next frame 206, and the JPEG encoder 113a starts image compression processing of the frame 205 which has been subjected to interpolation color processing. At the timing t17, the interpolation color processing circuit 111a starts interpolation color processing of a next frame 207, and the JPEG encoder 113b starts image compression processing of the frame 206 which has been subjected to interpolation color processing.

As mentioned above, since if the JPEG encoder 113a is performing image compression processing, the JPEG encoder 113b will perform image compression processing, and on the contrary, if the JPEG encoder 113b is performing image compression processing, the JPEG encoder 113a will perform image compression processing, the interpolation color processing circuit 111a can process the seven frames 201 to 207, continuously.

In addition, in the present embodiment, a case in which the time required for image compression processing is about 1.5 times that required for interpolation color processing has been described. However when the time required for image compression processing is about 2.5 times that required for interpolation color processing, the above-described processing can also be realized by a procedure in which storage areas for four frames (YUV1, YUV2, YUV3, and YUV4) for storing YCrCb data which has been subjected to interpolation color processing by an interpolation color processing circuit, and three JPEG encoders are provided, and the three JPEG encoders sequentially read the processed YCrCb data of frames and perform image compression processing.

In other words, the number of the compression circuits can be calculated by the following expression: the number of the compression circuits=a round-up integer value of the calculation value of (processing time of the image compression circuit for one frame)/(processing time of the interpolation color processing circuit for one frame). For example, the number of the compression circuits can be calculated as follows, that is, if the time required for image compression processing is about 1.5 times that required for interpolation color processing, the number will be two, if 2.5 times, the number will be three, and if 3.5 times, the number will be four. In addition, it is necessary for the number of storage areas for storing YCrCb data which has been subjected to interpolation color processing by the interpolation color processing circuit, to be at least the number of the compression circuits plus one.

As described above, in the case of FIG. 20, during processing time in which the interpolation color processing circuit 111 processes seven frames continuously, only interpolation color processing for five frames can be performed and image compression data of about four frames can be generated. However, in the case of FIG. 3 according to the present embodiment, interpolation color processing for seven frames can be performed and image compression data of about six frames can be generated.

(Second Embodiment)

Figure 4:
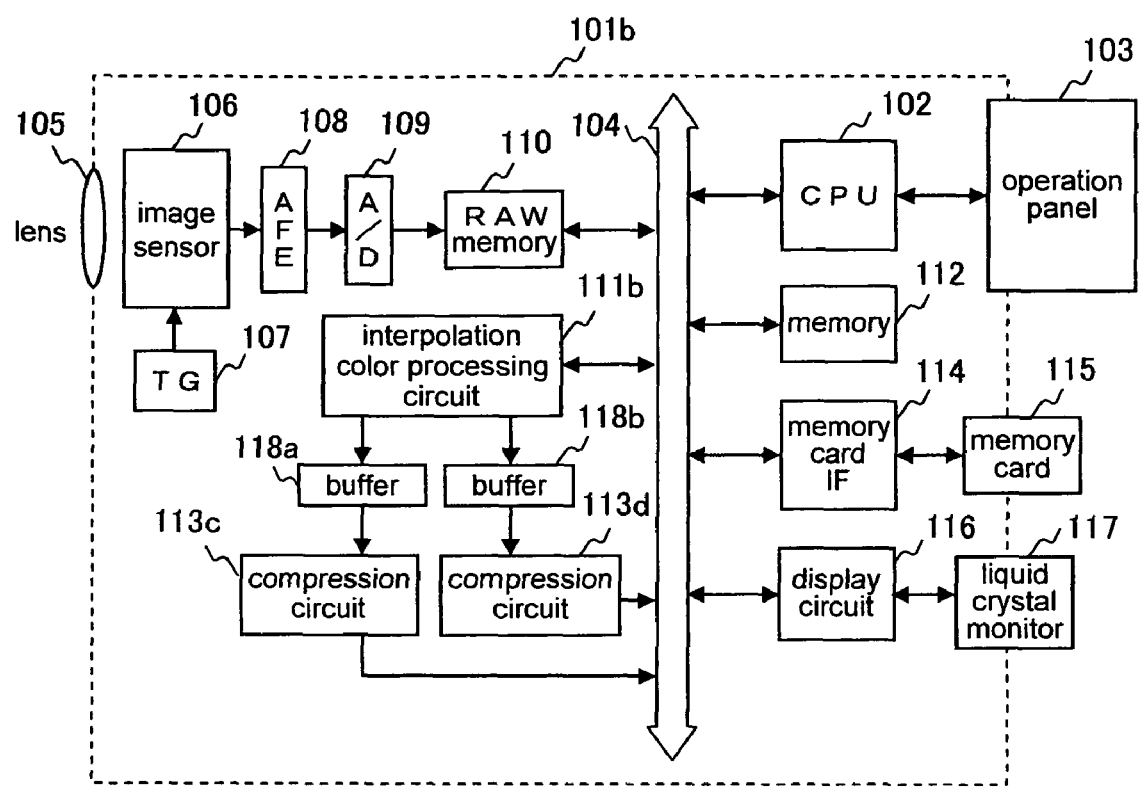
FIG. 4 is an entire block diagram of an image processing device according to a second embodiment.

Next, in FIG. 4, a block diagram of a camera 101b having an image processing device according to a second embodiment is illustrated. Although the basic configuration of the camera 101b is the same as that of the camera 101a in FIG. 1 according to the first embodiment, the camera 101b is configured so that buffers 118a and 118b are provided between an interpolation color processing circuit 111b and a compression circuit 113c and between the interpolation color processing circuit 111b and a compression circuit 113d, respectively. In other words, the interpolation color processing circuit 111b and the compression circuit 113c, and the interpolation color processing circuit 111b and the compression circuit 113d are directly connected through the buffers 118a and 118b, respectively, separately from a system bus 104.

In FIG. 4, until operations up to a step in which object light incident from a lens 105 is converted into an electric signal by an image sensor 106, and digital image data shot through an AFE 108 and an A/D 109 is stored in a RAW memory 110 are the same as those of the first embodiment.

After that, in a manner similar to the interpolation color processing circuit 111 in FIG. 20, the interpolation color processing circuit 111b reads RAW data from the RAW memory 110, performs interpolation processing and conversion processing from RGB data into brightness color difference (YCrCb) data, and stores the converted data in a memory 112 temporarily, as well as storing processed data that is part of a frame being subjected to interpolation color processing in the buffers 118a and 118b.

Figure 5:
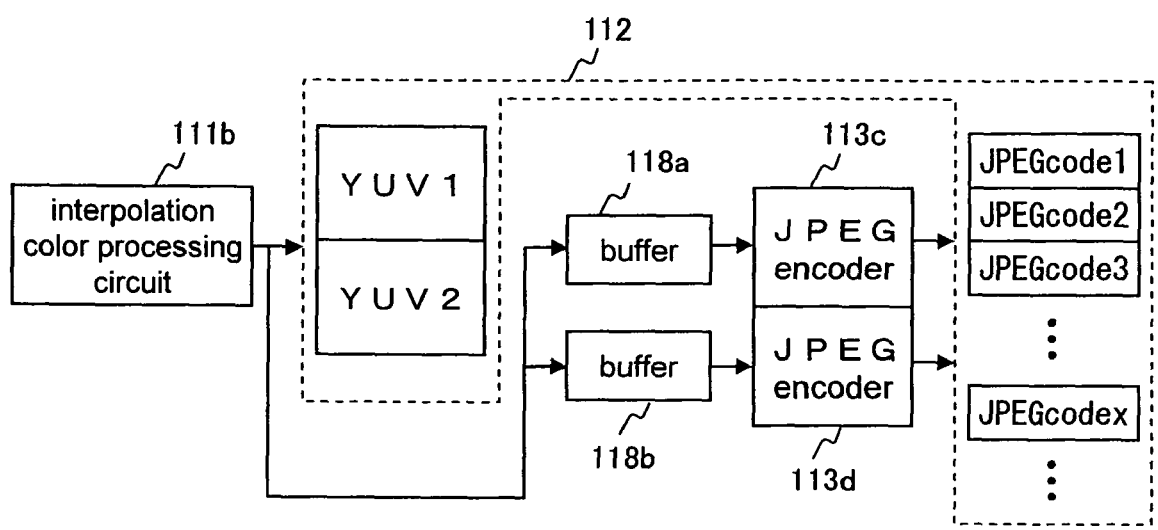
FIG. 5 is a block diagram of an image processing part of the image processing device according to the second embodiment.

Meanwhile, the compression circuits 113c and 113d read processed data stored in the buffers 118a and 118b, perform image compression processing thereon, and store the processed data in image compression data storage areas of the memory 112 through the system bus 104. This situation is illustrated in FIG. 5. Incidentally, here, in a manner similar to the first embodiment, the compression circuits 113c and 113d will be described as JPEG encoders 113c and 113d which perform image compression processing in accordance with JPEG standard.

In FIG. 5, in a manner similar to the case in FIG. 21, the YCrCb data which has been subjected to interpolation color processing is alternately stored in storage areas YUV1 and YUV2 for two frames provided at the memory 112. At the same time, part of the YCrCb data which has been subjected to interpolation color processing is stored in the buffers 118a and 118b. Here, the buffer 118a corresponds to a frame stored in the storage area YUV1, and the buffer 118b corresponds to a frame stored in the storage area YUV2.

The JPEG encoders 113c and 113d start up image compression processing as soon as the amount of data which can be subjected to image compression processing is accumulated in the buffers 118a and 118b, respectively.

Here, the amount of data which can be subjected to image compression processing, will be described. In general, if image compression processing in accordance with JPEG standard as in the present embodiment is performed, the amount of data which can be subjected to image compression processing differs depending on the ratio in number of pixels between Y and UV of YCrCb data (YUV data). For example, image data referred to as YUV422 is, in pixel number in transversal direction, down sampled so that two pixels of Y data correspond to one pixel of U data and one pixel of V data. On the contrary, in case of image compression processing in accordance with JPEG standard, since discrete cosine transform is carried out on each of Y, U and V for a unit of 8×8 pixels, in order to align eight pixels of U and V data in horizontal direction, a processing unit of 16×8 pixels with 16 pixels in transversal direction and 8 pixels in longitudinal direction is necessary at the very least.

Practically, since time for switching between buffers 118a and 118b and time for reading and writing are necessary, a plurality of processing units is necessary. Realistically, it is preferable to include, for example, eight lines of buffers 118a and 118b. In this case, if the pixels in transversal direction are 1600 pixels, one hundred (1600/16=100) of processing units will be ensured.

In FIG. 5, in a manner similar to the first embodiment, image compression data alternately generated by the JPEG encoders 113c and 113d, is stored in the image compression data storage areas of the memory 112 such that a first frame is JPEGcode1, a second frame is JPEGcode2, a third frame is JPEGcode3, and x-th frame is JPEGcodex.

Figure 6:
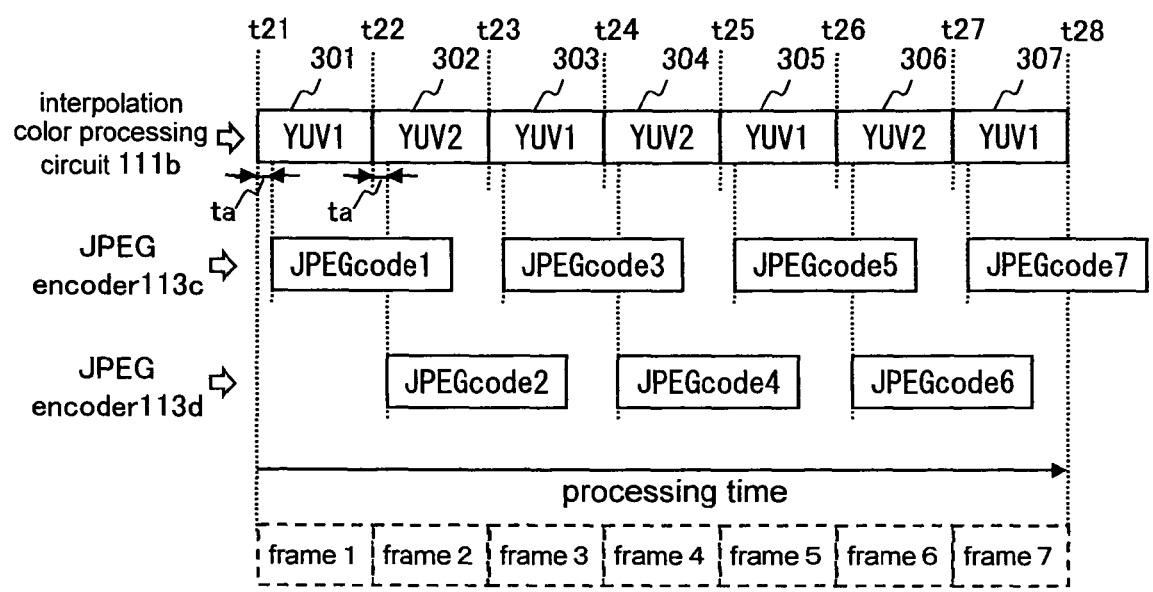
FIG. 6 is an explanatory diagram illustrating the order of image processing of the image processing device according to the second embodiment.

Next, with reference to FIG. 6, relationship between the above-mentioned processing and time will be described. FIG. 6 illustrates relationship of the processing time between the interpolation color processing circuit 111b and the JPEG encoders 113c and 113d. In order to compare FIG. 6 with FIG. 3 and FIG. 22, it is supposed that the time required for the image compression processing is about 1.5 times that for the interpolation color processing, and, time from the timing t1 to the timing t6 in FIG. 22 corresponds to that from the timing t21 to the timing t28 in FIG. 6 that is processing time when the interpolation color processing circuit 111b processes seven image frames continuously. Moreover, time ta indicates time required for accumulating amount of data which can be subjected to image compression processing, and the time ta corresponds to processing time of the interpolation color processing circuit 111b until amount of data of eight lines is accumulated here.

In FIG. 6, the interpolation color processing circuit 111b starts interpolation color processing of image data of a frame 301 at the timing t21, and starts to store a processed part of the data in the storage area YUV1 of the memory 112 and in the buffer 118a. At the time when the time ta passed from the timing t21, the JPEG encoder 113c is started up, performs image compression processing on the data stored in the buffer 118a, and starts to generate JPEGcode1.

At the timing t22, the interpolation color processing circuit 111b completes interpolation color processing of one frame of the frame 301, at the same time, starts interpolation color processing of the frame 302, and starts to store a processed part of the frame 302 in the storage area YUV2 of the memory 112 and in the buffer 118b. At the time when the time ta passed from the timing t22, the JPEG encoder 113d is started up, performs image compression processing on the data stored in the buffer 118b, and starts to generate JPEGcode2.

At the next timing t23, the interpolation color processing circuit 111b completes interpolation color processing of one frame of the frame 302, at the same time, starts interpolation color processing of the frame 303, and starts to store a processed part of the frame 303 in the storage area YUV1 of the memory 112 and in the buffer 118a. At the time when the time ta passed from the timing t23, the JPEG encoder 113c is started up, performs image compression processing on the data stored in the buffer 118a, and starts to generate JPEGcode3.

Subsequently, in a similar manner, at each of the timings t24 to t27, at the time when the time ta passed from each of the timings, the JPEG encoder 113c or 113d is started up, performs image compression processing on the data stored in the buffer 118a or 118b, and starts to generate JPEGcode4 to JPEGcode7.

As mentioned above, even if the interpolation color processing circuit 111b does not finish interpolation color processing of entire one frame, the circuit 111b can perform image compression processing using processed data stored in the buffer 118a or 118b. Moreover, in a manner similar to the first embodiment, since, while the JPEG encoder 113c is performing image compression processing on a previous frame, the JPEG encoder 113d performs image compression processing on a next frame, inversely, while the JPEG encoder 113d is performing image compression processing on a previous frame, the JPEG encoder 113c performs image compression processing on a next frame, even if processing time of image compression processing on one frame is longer than that of interpolation color processing on one frame, the interpolation color processing circuit 111b can process the seven frames 301 to 307 continuously.

Note that, in the present embodiment, a case in which the time required for image compression processing is about 1.5 times that required for interpolation color processing has been described. However, for example, when the time required for image compression processing is about 2.5 times that required for interpolation color processing, by providing three buffers for storing YCrCb data which has been subjected to interpolation color processing by an interpolation color processing circuit, and three JPEG encoders, the above-described processing can be realized by a procedure in which the three JPEG encoders sequentially read the processed YCrCb data and cyclically perform image compression processing thereon.

In other words, the number of the buffers and the compression circuits can be calculated by the following expression: the number of the buffers and the compression circuits=a round-up integer value of the calculation value of (processing time of the image compression circuit for one frame)/(processing time of the interpolation color processing circuit for one frame). For example, the number of the buffers and the compression circuits can be calculated as follows, that is, if the time required for image compression processing is about 1.5 times that required for interpolation color processing, the number will be two, if 2.5 times, the number will be three, and if 3.5 times, the number will be four. Incidentally, although the number of storage areas for storing YCrCb data which has been subjected to interpolation color processing by the interpolation color processing circuit is not changed, it is necessary to cyclically store data of frames the number of which is equal to the number of the buffers, in the buffers.

As described above, in the case of FIG. 3 according to the first embodiment, during processing time in which seven frames are subjected to interpolation color processing continuously, image compression data of about six frames can be generated. However, according to the present embodiment, image compression data of about seven frames can be generated. Moreover, since the number of storage areas in the memory 112 for storing the YCrCb data which has been subjected to interpolation color processing, can be reduced by one frame as compared to the case of the first embodiment, it is also possible to reduce the cost of the memory while performing interpolation color processing continuously.

Note that, although, in the present embodiment, buffers 118a and 118b are provided, a configuration in which the compression circuits 113c and 113d read YCrCb data which has been subjected to interpolation color processing, from the storage area in the memory 112, as soon as the necessary amount of the data which can be subjected to image compression processing is accumulated on the area, and perform image compression processing thereon, may also be used.
(Third Embodiment)

Figure 7:
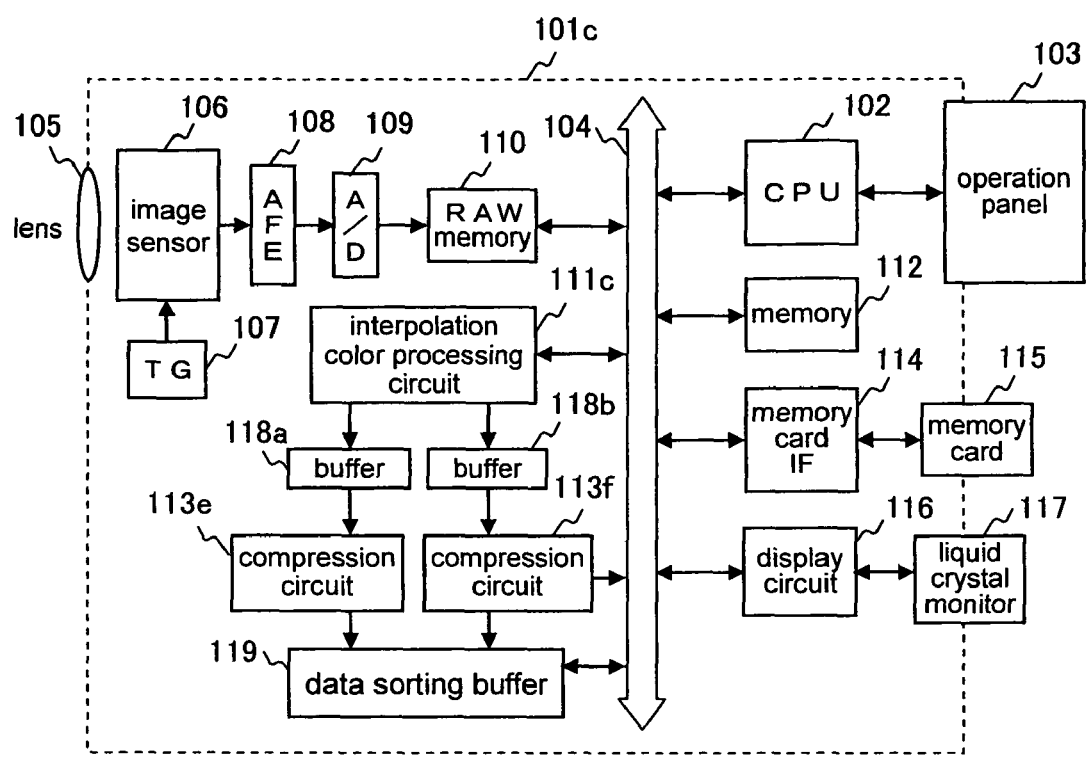
FIG. 7 is an entire block diagram of an image processing device according to a third embodiment.

Next, in FIG. 7, a block diagram of a camera 101c having an image processing device according to a third embodiment is illustrated. Although, the basic configuration of the camera 101c is the same as that of the camera 101b in FIG. 4 according to the second embodiment, the camera 101c is configured so that the outputs of the compression circuits 113e and 113f are coupled to the system bus 104 through a data alignment buffer 119.

In FIG. 7, until operations up to a step in which object light incident from a lens 105 is converted into an electric signal by an image sensor 106, and digital image data shot through an AFE 108 and an A/D 109 is stored in a RAW memory 110, are the same as those of the first and second embodiments.

After that, in a manner similar to the interpolation color processing circuit 111 in FIG. 20, the interpolation color processing circuit 111c reads RAW data from the RAW memory 110, performs interpolation processing and conversion processing from RGB data into YCrCb data, and stores the converted data in a memory 112 temporarily, as well as storing processed data that is part of a frame being subjected to interpolation color processing, in the buffers 118a and 118b.

Meanwhile, the compression circuits 113e and 113f read processed data stored in the buffers 118a and 118b for each predetermined amount of data (for each processing unit), perform image compression processing thereon, and stores the processed data in the data alignment buffer 119. At that time, the data alignment buffer 119, when storing the processed data therein, alternately aligns and stores the image compression data output from the compression circuits 113e and 113f. After that, in a manner similar to the first and the second embodiments, the aligned image compression data of one frame is stored in the storage areas of the memory 112 through the system bus 104. Note that, at that time, a configuration in which the image compression data is not aligned when it is stored in the data alignment buffer 119, instead, a CPU 102, when reading the image compression data from the buffer 119, aligns and reads the data, and then stores it in the compression data storage areas of the memory 112, may be used.

Next, with reference to FIG. 8, the situation of these series of operations will be described. Incidentally, here, in a manner similar to the first and second embodiments, the compression circuits 113e and 113f will be described as JPEG encoders 113e and 113f which perform image compression processing in accordance with JPEG standard.

Figure 8:
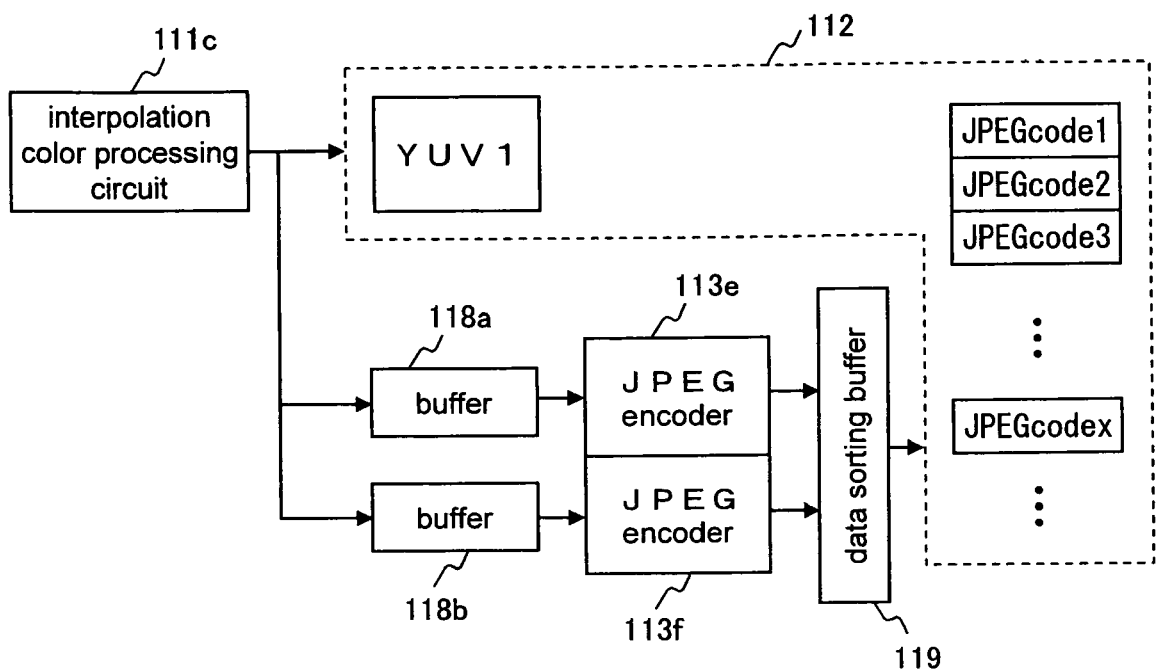
FIG. 8 is a block diagram of an image processing part of the image processing device according to the third embodiment.

In FIG. 8, the YCrCb data output by the interpolation color processing circuit 111c is stored in the storage area YUV1 for one frame provided at the memory 112. At the same time, in a manner similar to the second embodiment, part of the YCrCb data which has been subjected to interpolation color processing, is stored in the buffers 118a and 118b. Here, the frame stored in the storage area YUV1 is divided into a plurality of parts, and each of the parts is stored in the buffers 118a and 118b, alternately. Here, the divided part is a unit of, for example, eight lines or 16 lines. Accordingly, the buffers 118a and 118b may have memory capacity capable of storing at least each of the divided parts.

The JPEG encoders 113e and 113f start up image compression processing as soon as the amount of data which can be subjected to image compression processing is accumulated in the buffers 118a and 118b. In addition, the amount of data which can be subjected to image compression processing is the same as that in the second embodiment, in case of, for example YUV422, a processing unit of 16×8 pixels with 16 pixels in transversal direction and 8 pixels in longitudinal direction is the amount of data which can be subjected to image compression processing.

Figure 9:
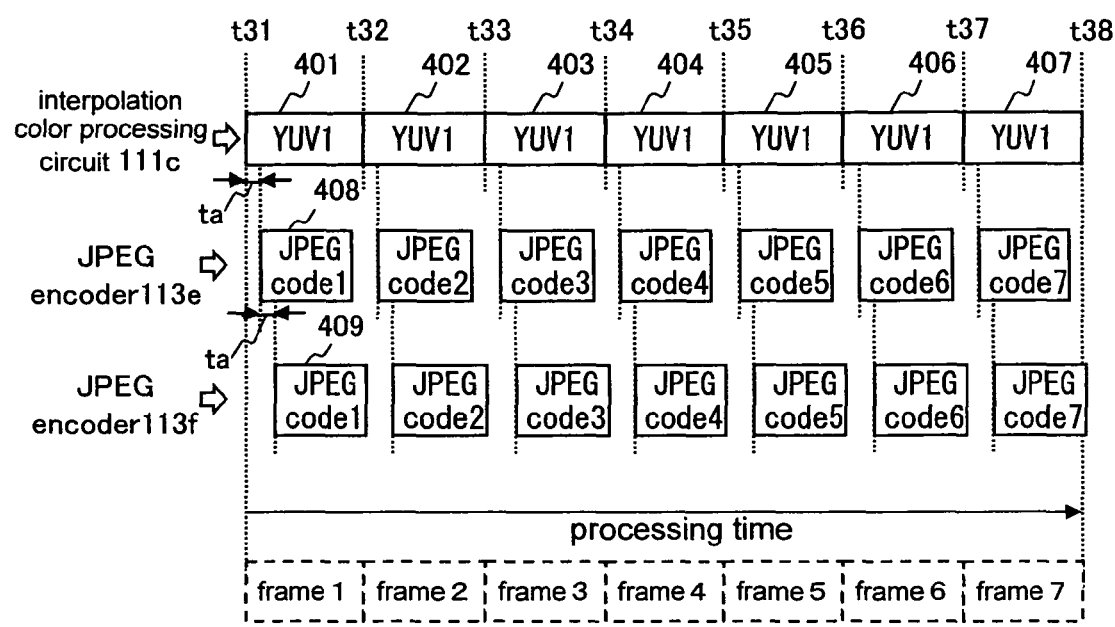
FIG. 9 is an explanatory diagram illustrating the order of image processing of the image processing device according to the third embodiment.

Next, with reference to FIG. 9, relationship between the above-mentioned processing and time will be described. FIG. 9 illustrates relationship of the processing times between the interpolation color processing circuit 111c and the JPEG encoders 113e and 113f. In order to compare FIG. 9 with FIG. 22, FIG. 3 and FIG. 6, it is also supposed that the time required for the image compression processing is about 1.5 times that for the interpolation color processing, and, time from the timing t1 to the timing t6 in FIG. 22 corresponds to that from the timing t31 to the timing t38 in FIG. 9 that is processing time when the interpolation color processing circuit 111c processes seven image frames continuously. Moreover, time ta indicates time required for accumulating amount of data which can be subjected to image compression processing, and the time ta corresponds to processing time of the interpolation color processing circuit 111c until amount of data of eight lines is accumulated here.

In FIG. 9, the interpolation color processing circuit 111c starts interpolation color processing of image data of a frame 401 at the timing t31, and starts to store processed part of the data in the storage area YUV1 of the memory 112 and in the buffer 118a. At the time when the time ta passed from the timing t31, the JPEG encoder 113e is started up, starts to perform image compression processing of the data stored in the buffer 118a, and starts to generate JPEGcode1 partially.

Meanwhile, at the time when the time ta passed from the timing t31, the interpolation color processing circuit 111c, while continuously storing the image data of the frame 401 which has been subjected to interpolation color processing, in the storage area YUV1 of the memory 112, starts to store the data in the buffer 118b. Then, at the time when the time ta×2 passed from the timing t31, the JPEG encoder 113f is started up, starts to perform image compression processing of the data stored in the buffer 118b, and starts to generate JPEG-code1 partially.

In a similar manner, every time when time ta will pass (or every time when the interpolation color processing circuit 111c processes a predetermined part), the interpolation color processing circuit 111c stores the processed data in the buffers 118a and 118b, alternately, and the JPEG encoders 113e and 113f read amount of data which can be subjected to image compression processing, from each of the buffers 118a and 118b, perform image compression processing thereon, and stores the image compression data in the data alignment buffer 119. In this manner, the JPEG encoders 113e and 113f output image compression data JPEGcode1 (408) and JPEG-code1 (409) that are image compression data generated by dividing the JPEGcode1 alternately for each of processing units, to the data alignment buffer 119.

Here, image compression data alternately generated by the JPEG encoders 113e and 113f, in a manner different from the second embodiment, for example, a first frame JPEGcode1 is divided into each of processing units which can be subjected to image compression processing, and they are output alternately. If JPEGcode1 is divided into four processing units JPEGcode1-1, JPEGcode1-2, JPEGcode1-3, and JPEG-code1-4, the JPEG encoder 113e outputs JPEGcode1-1, then, the JPEG encoder 113f outputs JPEGcode1-2, then, the JPEG encoder 113e outputs JPEGcode1-3, and then, the JPEG encoder 113f outputs JPEGcode1-4. The data alignment buffer 119, by aligning these divided and alternately output image compression data JPEGcode1-1, JPEGcode1-2, JPEGcode1-3, and JPEGcode1-4, and by continuously joining each of the image compression data, generates one frame of image compression data JPEGcode1. The first frame image compression data JPEGcode1 generated by the buffer 119 is stored in the image compression data storage area of the memory 112, in a manner similar to the first and the second embodiments.

Also at the timing t32, in a manner similar to the case of the timing t31, the interpolation color processing circuit 111c performs interpolation color processing on the image data of the frame 402, and, at the time when the time ta passed from the timing t32, the JPEG encoder 113e is started up, and, at the time when the time ta passed further, the JPEG encoder 113f is started up, and they generate JPEGcode2 partially, respectively, and generate one frame of image compression data JPEGcode2 in the data alignment buffer 119.

Subsequently, in a similar manner, at the timing t33, image compression data JPEGcode3 is generated by processing the image data of the frame 403, at the timing t34, image compression data JPEGcode4 is generated by processing the image data of the frame 404, at the timing t35, image compression data JPEGcode5 is generated from the image data of the frame 405, at the timing t36, image compression data JPEGcode6 is generated from the image data of the frame 406, and, at the timing t37, image compression data JPEG-code7 is generated from the image data of the frame 407, respectively.

Note that, in the present embodiment, although the data alignment buffer 119 is provided, a configuration in which divided pieces of image compression data are aligned in the memory 112 may be used.

Moreover, in the present embodiment, a case in which the time required for image compression processing is about 1.5 times that required for interpolation color processing has been described. However, for example, in a case of about 2.5 times, in a manner similar to the second embodiment, the above-described processing can be realized by a procedure in which, three buffers for storing YCrCb data which has been subjected to interpolation color processing by an interpolation color processing circuit, and three JPEG encoders, are provided, one frame of image data is cyclically divided into three pieces of data for each processing unit, and the three JPEG encoders perform image compression processing thereon. In addition, in this case, the data alignment buffer 119 aligns the three pieces of output image compression data, and converts them into one frame of image compression data.

The number of buffers and compression circuits in this embodiment can approximately be calculated by the following expression. It is a round-up integer value of a calculation value of the number of buffers and compression circuits≈ (processing time of an image compression circuit for one frame)/(processing time of an interpolation color processing circuit for one frame). For example, approximation can be made as follows. When a time required for the image compression processing is about 1.5 times that required for the interpolation color processing, the number of buffers and compression circuits is two; when 2.5 times, it is three; and when 3.5 times, it is four. Incidentally, this expression is used where a time ta in FIG. 9≈0, and holds when the time ta is short enough with respect to the entire processing time.

In this way, in this embodiment, even if the interpolation color processing circuit 111c does not finish the entire processing of one frame, the image compression processing can be performed using processed data stored in the buffer 118a or 118b. Moreover, since one frame is divided to be subjected to image compression processing by the two the JPEG encoders 113e and 113f, image compression processing can finish in substantially the same processing time as that of the interpolation color processing circuit 111c.

(Fourth Embodiment)

Now, a camera having an image processing device according to a fourth embodiment will be described. Incidentally, the basic configuration of the camera according to this embodiment is the same as that of the camera 101a of FIG. 1 according to the first embodiment. In addition, FIG. 2 illustrating an arrangement in which the interpolation color processing circuit 111a, the JPEG encoder 113a and the JPEG encoder 113b input or output data via the memory 112 is also the same as in the first embodiment.

According to this embodiment, the JPEG encoder 113a and the JPEG encoder 113b, when performing image compression processing, carries out fixed length compression so that a code amount after compression falls within a predetermined range. In general, image compression processing in accordance with JPEG standard performs orthogonal conversion such as DCT (discrete cosine transform) on each pixel block of about 8×8 pixels to convert an image data to a space frequency element data. In addition, quantization is made using a quantization table of defining a quantization coefficient of each space frequency element. Although an image comes to be fine as a quantization bit number increases, the code amount after compression processing becomes larger, so that when a fixed length compression is carried out, processing is performed which adjusts the quantization bit number to be assigned by multiplying the quantization table by a coefficient that is referred to as a scaling factor. After that, the space frequency element data having been DCT-converted using the adjusted quantization table is quantized. That is, quantization is made by the calculation of (DCT coefficient) ÷(quantization table×scaling factor). The quantized data is made to be one-dimensional by zigzag scan, and then subjected to variable-length encoding such as Huffman encoding, which completes the image compression processing.

Figure 10:
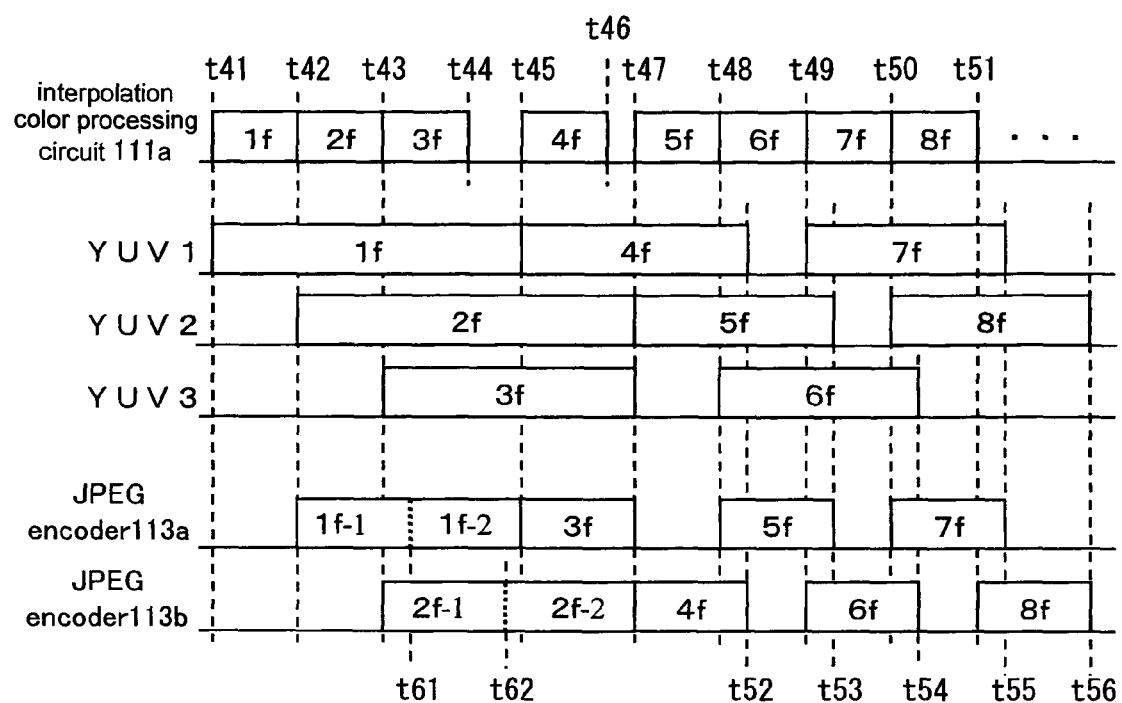
FIG. 10 is an explanatory diagram illustrating the order of image processing of an image processing device according to a fourth embodiment.

To obtain the code amount after compression, however, an image needs to be once compressed, and in this embodiment, processed as in FIG. 10. FIG. 10 is a diagram illustrating a time relationship between a processing time of the interpolation color processing circuit 111a, the JPEG encoder 113a and the JPEG encoder 113b, and a usage time of buffers YUV1, YUV2 and YUV3 in the memory 112 when performing compression processing on continuous frames from the first frame (1f) to the eighth frame (8f). Incidentally, although there is a vacant time both between the third frame (3f) and the fourth frame (4f) and between the fourth frame (4f) and the fifth frame (5f), it is a time of waiting for processing of the interpolation color processing circuit 111a until the buffers YUV1, YUV2 and YUV3 are vacant. Actually, an image shot during this time is buffered in the RAW memory 110 of FIG. 1.

Furthermore, according to this embodiment, the JPEG encoders 113a and 113b use a common quantization table, and the JPEG encoder 113a and the JPEG encoder 113b use a scaling factor Sa and a scaling factor Sb respectively. In addition, a storing area of each scaling factor is secured in the memory 112. Incidentally, when starting compression processing of a series of images, each of an initial value of the scaling factor Sa and an initial value of the scaling factor Sb that have preliminarily been defined are set; and during performing compression processing on a series of images, the scaling factor Sa and the scaling factor Sb at the time of performing the next compression processing are estimated from the code amounts thereof every time image compression processing is performed to update respective scaling factor Sa and scaling factor Sb.

In FIG. 10, interpolation color processing of the first frame (1f) is performed using the buffer YUV1 during a time of timing t41 to timing t42 at the interpolation color processing circuit 111a. When the interpolation color processing of the first frame (1f) finishes, the JPEG encoder 113a performs image compression processing on the first frame (1f) using the buffer YUV1 during a time of timing t42 to timing t45.

First, the JPEG encoder 113a, using the scaling factor Sa of an initial value having been set first, performs the first compression processing (preliminary compression processing) on an image of the first frame during a time of initial timings t42 to t61. Subsequently, the JPEG encoder 113a, based on the code amount obtained at the first compression processing, estimates such a scaling factor that the code amount at the time when performing the next compression processing falls within a predetermined range, and updates the scaling factor Sa.

During a time of timings t61 to t45, the JPEG encoder 113a, using the updated scaling factor Sa, performs the second compression processing on the image of the first frame (1f), and based on the code amount obtained at the second compression processing, estimates such a scaling factor that the code amount at the time when performing the next compression processing falls within a predetermined range and updates the scaling factor Sa.

Similarly, interpolation color processing of the second frame (2f) is performed using the buffer YUV2 during a time of timings t42 to t43 at the interpolation color processing circuit 111a. When the interpolation color processing of the second frame (2f) finishes, the JPEG encoder 113b performs image compression processing on the second frame (2f) using the buffer YUV2 during a time of timings t43 to t47.

First, the JPEG encoder 113b, using the scaling factor Sb of a first set initial value, performs the first compression processing (preliminary compression processing) on an image of the second frame (2f) during a time of initial timings t43 to t62. Subsequently, the JPEG encoder 113b, based on the code amount obtained at the first compression processing, estimates such a scaling factor that the code amount at the time when performing the next compression processing falls within a predetermined range and updates the scaling factor Sb.

During a time of timings t62 to t47, the JPEG encoder 113b, using the updated scaling factor Sb, performs the second compression processing on the image of the second frame (2f), and based on the code amount obtained at the second compression processing, estimates such a scaling factor that the code amount at the time when performing the next compression processing falls within a predetermined range and updates the scaling factor Sb.

Interpolation color processing of the third frame (3/1 is performed using the buffer YUV3 during a time of timings t43 to t44 at the interpolation color processing circuit 111a. When the interpolation color processing of the third frame (3f) finishes, the JPEG encoder 113a having finished the compression processing of the first frame (1f), performs image compression processing on the third frame (3f) using the scaling factor Sa with the use of the buffer YUV3 during a time of timings t45 to t47. Furthermore, the JPEG encoder 113a, based on the obtained code amount, estimates such a scaling factor that the code amount at the time when performing the next compression processing falls within a predetermined range and updates the scaling factor Sa. Here, although interpolation color processing of the third frame (3f) has finished at the timing t44, the JPEG encoder 113a is performing the compression processing on the first frame (1f), so that waiting for the timing t45 at which this compression processing finishes, the JPEG encoder 113a performs compression processing on the third frame (3f).

Interpolation color processing of the fourth frame (4f) is performed using the buffer YUV1 during a time of timings t45 to t46 at the interpolation color processing circuit 111a. Here, at the timing t44 at which the interpolation color processing of the third frame (3f) finishes, the buffer YUV1 is being used for the compression processing of the first frame (1f), so that waiting for the timing t45 at which the buffer YUV 1 is vacant, the interpolation color processing circuit 111a performs interpolation color processing on the fourth frame (4f). When the interpolation color processing of the fourth frame (4f)

finishes at the timing t46, waiting for a timing t47 at which the compression processing of the second frame (2f) of the JPEG encoder 113b finishes, the JPEG encoder 113b performs image compression processing on the fourth frame (4f) using the scaling factor Sb. In addition, based on the obtained code amount, the JPEG encoder 113b estimates such a scaling factor that the code amount at the time when performing the next compression processing falls within a predetermined range and updates the scaling factor Sb.

Subsequently, processing of the fifth frame (5f) is performed using the buffer YUV2. The interpolation color processing circuit 111a performs interpolation color processing during timings t47 to t48, and the JPEG encoder 113a performs image compression processing using the scaling factor Sa during timings t48 to t53, and based on the code amount thereof, estimates such a scaling factor that the code amount at the time when performing the next compression processing falls within a predetermined range and updates the scaling factor Sa.

Similarly, processing of the sixth frame (6f) is performed using the buffer YUV3. The interpolation color processing circuit 111a performs interpolation color processing during timings t47 to t48, and the JPEG encoder 113b performs image compression processing using the scaling factor Sb during timings t48 to t54, and based on the code amount thereof, estimates such a scaling factor that the code amount at the time when performing the next compression processing falls within a predetermined range and updates the scaling factor Sb.

Similarly, processing of the seventh frame (7f) is performed using the buffer YUV1. The interpolation color processing circuit 111a performs interpolation color processing during timings t49 to t50, and the JPEG encoder 113a performs image compression processing using the scaling factor Sa during timings t50 to t55, and based on the code amount thereof, estimates such a scaling factor that the code amount at the time when performing the next compression processing falls within a predetermined range and updates the scaling factor Sa.

Similarly, processing of the eighth frame (8f) is performed using the buffer YUV2. The interpolation color processing circuit 111a performs interpolation color processing during timings t50 to t51, and the JPEG encoder 113b performs image compression processing using the scaling factor Sb during timings t51 to t56, and based on the code amount thereof, estimates such a scaling factor that the code amount at the time when performing the next compression processing falls within a predetermined range and updates the scaling factor Sb. From then on, the same image compression processing will be repeated until a series of shootings finish.

In this way, in the camera 101a having the image processing device according to this embodiment, when performing compression processing on images that are continuously shot, the image compression processing of an odd-numbered frame is performed by the JPEG encoder 113a and the image compression processing of an even-numbered frame is performed by the JPEG encoder 113b, so that image compression processing can be performed at high speed without depending on the processing time taken to make an image compression.

Furthermore, there are provided independently the scaling factor Sa and the scaling factor Sb of the JPEG encoder 113a and the JPEG encoder 113b respectively, and a preliminary compression is performed only with the first frame of each of the odd-numbered frame and the even-numbered frame to obtain a proper scaling factor, so that image compression processing can be performed using a proper scaling factor having been updated without making a preliminary compression for the subsequent frames, thus enabling to implement an efficient fixed length compression processing.

Incidentally, although in this embodiment, the JPEG encoder 113a and the JPEG encoder 113b use independently the scaling factor Sa and the scaling factor Sb respectively, it is preferable that the scaling factor Sa and the scaling factor Sb are made to be one, and that both the JPEG encoder 113a and the JPEG encoder 113b use this scaling factor.

(Fifth Embodiment)

Now, a camera having an image processing device according to a fifth embodiment will be described. Incidentally, the basic configuration of the camera according to this embodiment is the same as that of the camera 101a of FIG. 1 according to the first embodiment. In addition, FIG. 2 illustrating an arrangement in which the interpolation color processing circuit 111a, the JPEG encoder 113a and the JPEG encoder 113b input or output data via the memory 112 is the same as in the first embodiment.

Also in this embodiment, as in the fourth embodiment, the JPEG encoder 113a and the JPEG encoder 113b use a common quantization table and make a fixed length compression. What is different from the fourth embodiment is that in FIG. 10, a preliminary compression is made with the first frame of each of the odd-numbered frame and the even-numbered frame to obtain a proper scaling factor, but in this embodiment, based on the code amount at the time when making a preliminary compression only with the first frame of the odd-numbered frame, such a scaling factor that the code amount at the time when performing the next compression processing falls within a predetermined range is estimated, and both the scaling factor Sa and the scaling factor Sb are updated. After that, as is the fourth embodiment, image compression processing of the odd-numbered frame is performed using the scaling factor Sa and image compression processing of the even-numbered frame is performed using the scaling factor Sb.

Figure 11:
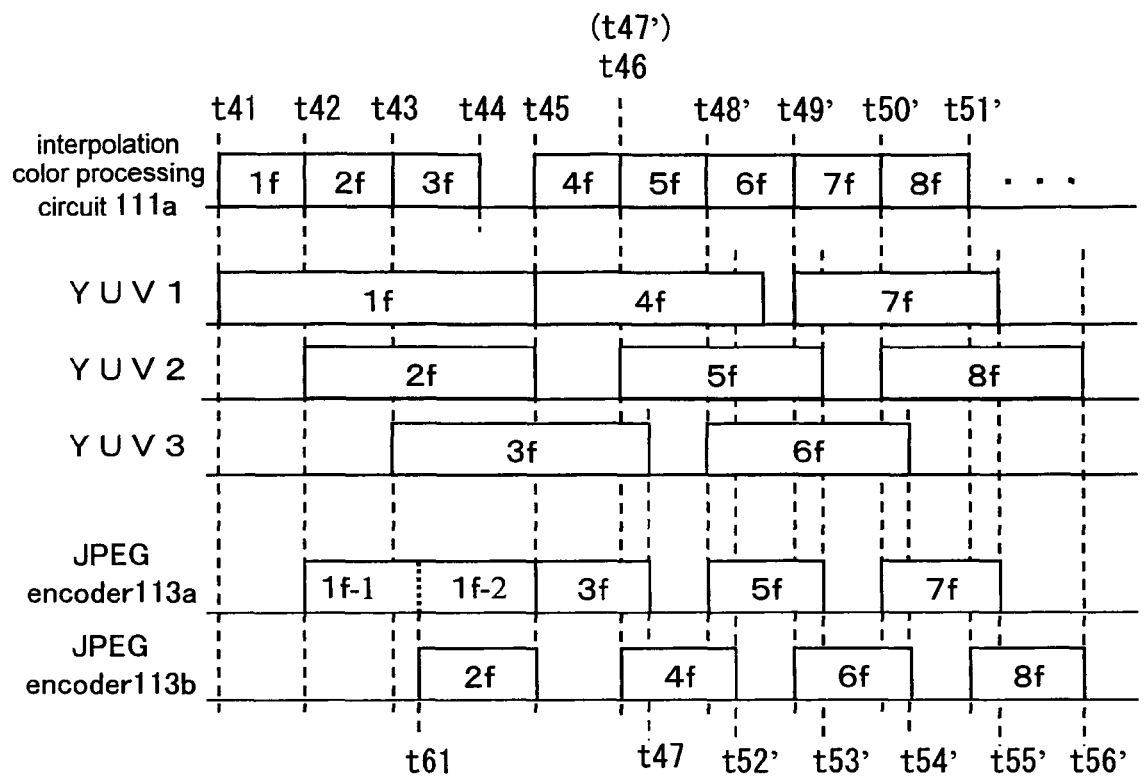
FIG. 11 is an explanatory diagram illustrating the order of image processing of an image processing device according to a fifth embodiment.

Therefore, according to this embodiment, as illustrated in FIG. 11, image compression processing of the second frame (2f) finishes at a timing t45, and image compression processing of the fourth frame (4f) can be performed without waiting. Further, the buffer YUV2 being used for processing of the second frame (2f) is released at the timing t45 as well, so that interpolation color processing of the fifth frame (5f) can also be performed from a timing t46 without waiting. Incidentally, in FIG. 11, a timing to which "'" is added such as timing t' represents for a timing a little different from a timing t of the same number without "'" of FIG. 10. For example, although a timing t47 of FIG. 10 represents a time point of starting an interpolation color processing of the fifth frame (5f), and a timing t47' of FIG. 11 represents a time point of starting the interpolation color processing of the same fifth frame (5f) as well, both of them are to be timings subsequent to an end timing of the interpolation color processing of the fourth frame (4f).

In this way, in the camera 101a having the image processing device according to this embodiment, when performing compression processing on images that are continuously shot, the image compression processing of an odd-numbered frame is performed by the JPEG encoder 113a and the image compression processing of an even-numbered frame is performed by the JPEG encoder 113b, so that image compression processing can be performed at high speed without depending on the processing time taken to make an image compression.

Further, there are provided independently the scaling factor Sa and the scaling factor Sb of the JPEG encoder 113a and the JPEG encoder 113b respectively, and based on the code amount at the time of a preliminary compression only with the first frame of an odd-numbered frame, such a scaling factor that the code amount at the time when performing the next compression processing falls within a predetermined range is estimated to update both the scaling factor Sa and the scaling factor Sb; so that no preliminary compression processing of the second frame (2f) needs to be performed, and as compared with the fourth embodiment, a compression processing time can be shortened. In addition, the third frame (3f) and subsequent frames are to be processed as is the fourth embodiment, so that image compression processing can be performed using a proper scaling factor that is updated all the time, thus enabling to implement an efficient fixed length compression processing.

Incidentally, although in this embodiment, the JPEG encoder 113a and the JPEG encoder 113b use independently the scaling factor Sa and the scaling factor Sb respectively, it is preferable that the scaling factor Sa and the scaling factor Sb are made to be one, and that both the JPEG encoder 113a and the JPEG encoder 113b use this scaling factor.

(Sixth Embodiment)

Now, a camera having an image processing device according to a sixth embodiment will be described. Incidentally, the basic configuration of the camera according to this embodiment is the same as that of the camera 101a of FIG. 1 according to the first embodiment. In addition, FIG. 2 illustrating an arrangement in which the interpolation color processing circuit 111a, the JPEG encoder 113a and the JPEG encoder 113b input or output data via the memory 112 is also the same as in the first embodiment.

Also in this embodiment, as in the fifth embodiment, the JPEG encoder 113a a and the JPEG encoder 113b, using a common quantization table, make a fixed length compression; and based on the code amount at the time when making a preliminary compression only with the first frame of an odd-numbered frame, such a scaling factor that the code amount at the time when performing the next compression processing falls within a predetermined range is estimated, to update both the scaling factor Sa and the scaling factor Sb.

The present embodiment is different from the fifth embodiment in performing compression processing on images of different sizes of the same frame. For example, a general electronic camera, other than an image (actual image) for storing a shot image, needs to compress images of a plurality of sizes such as a preview image for display on a liquid crystal monitor 117 of FIG. 1 or a thumbnail image for list display. For example, as is 3072×2304 pixels of an actual image, 640×480 pixels of a preview image and 160×120 pixels of a thumbnail image, the numbers of pixels forming images are significantly different, and a larger time is required to perform compression processing as the number of pixels increases. In this embodiment, the case of performing compression processing on images of two sizes of an actual image and a preview image will be described.

Figure 12:
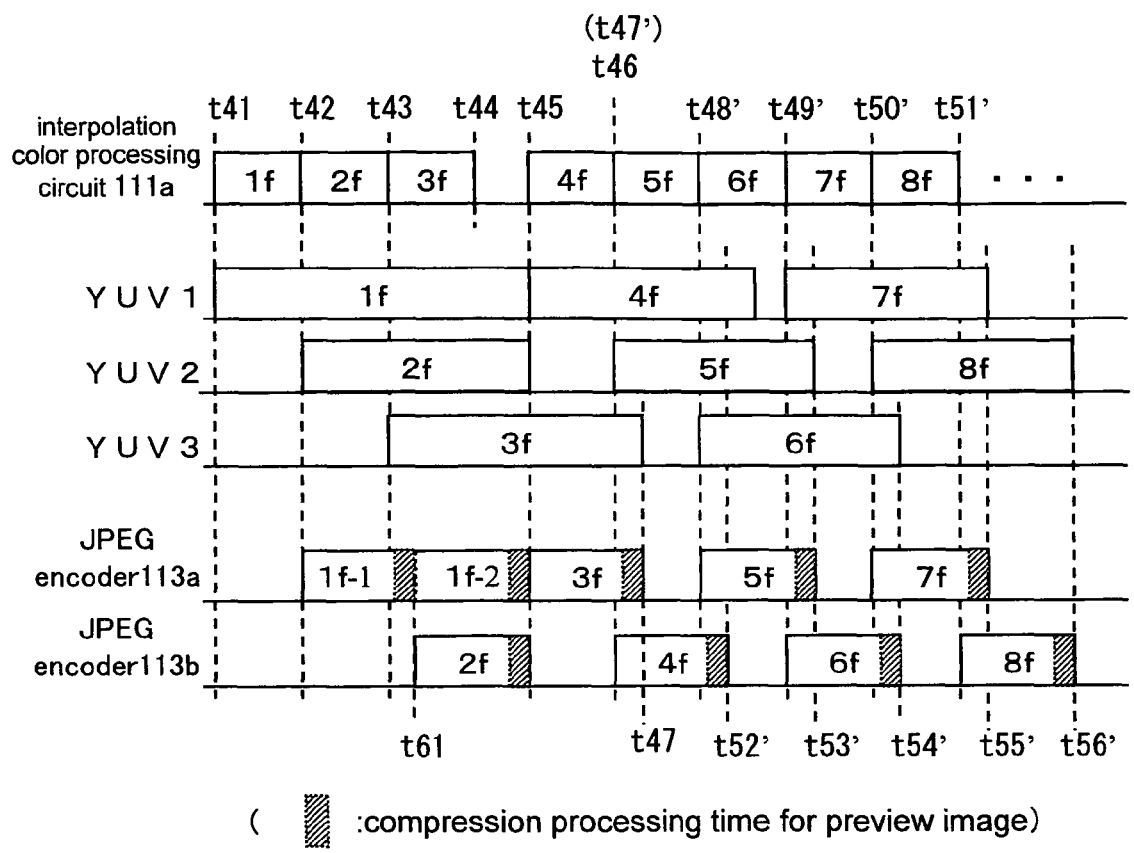
FIG. 12 is an explanatory diagram illustrating the order of processing of a preview image.

A preview display is performed actually in most electronic cameras, so that no descriptions have particularly been made, but also in the fifth embodiment illustrated in FIG. 11, compression processing of a preview image can be thought to be included in the compression processing of an actual image to be performed. What illustrates situations thereof is FIG. 12. Although FIG. 12 illustrates each processing in exactly the same timing as that of FIG. 11, diagonally shaded areas of each compression processing are time periods when performing compression processing on a preview image. For example, there is illustrated at a rear portion of the first compression processing of the first frame (1f) a time period of performing the first compression processing on a preview image of the first frame (1f) that is illustrated to be a diagonally shaded area. Similarly, shown is a time period of performing compression processing on a preview image that is illustrated to be a diagonally shaded area at the rear portion of the second compression processing of the first frame (1f) and each compression processing from the second frame (2f) to the eighth frame (8f).

Furthermore, also on a preview image as well as an actual image, the JPEG encoder 113a and the JPEG encoder 113b make a fixed length compression using a common quantization table. In addition, the JPEG encoder 113a and the JPEG encoder 113b use a scaling factor Sc for an odd-numbered frame of a preview image and a scaling factor Sd for an even-numbered frame of a preview image. A storing area of the scaling factor Sc for an odd-numbered frame of a preview image and the scaling factor Sd for an even-numbered frame of a preview image are secured in the memory 112. Further, an update procedure of the scaling factor Sc and the scaling factor Sd can also be thought to be the same as that of the scaling factor Sa and the scaling factor Sb of an actual image; and based on the code amount obtained at the first preliminary image compression processing of a preview image of the first frame (1f), such a scaling factor that the code amount at the time when performing the next compression processing falls within a predetermined range is estimated, to update the scaling factor Sc and the scaling factor Sd. Furthermore, the second compression processing of a preview image of the first frame (1f) is performed using the updated scaling factor Sc, and compression processing of a preview image of the second frame (2f) is performed using the updated scaling factor Sd. After that, while updating the scaling factor Sc and the scaling factor Sd, compression processing of preview images of the odd-numbered frame and the even-numbered frame is repeated.

In this way, in processing of the fifth embodiment, compression processing of an actual image and a preview image of different sizes has to be performed in series by the same JPEG encoder as processing of the same frame. Whereas, in this embodiment, as is illustrated in FIG. 13, the compression processing of an actual image of the same frame and the compression processing of a preview image of the same frame are performed by parallel processing at different JPEG encoders.

Figure 13:
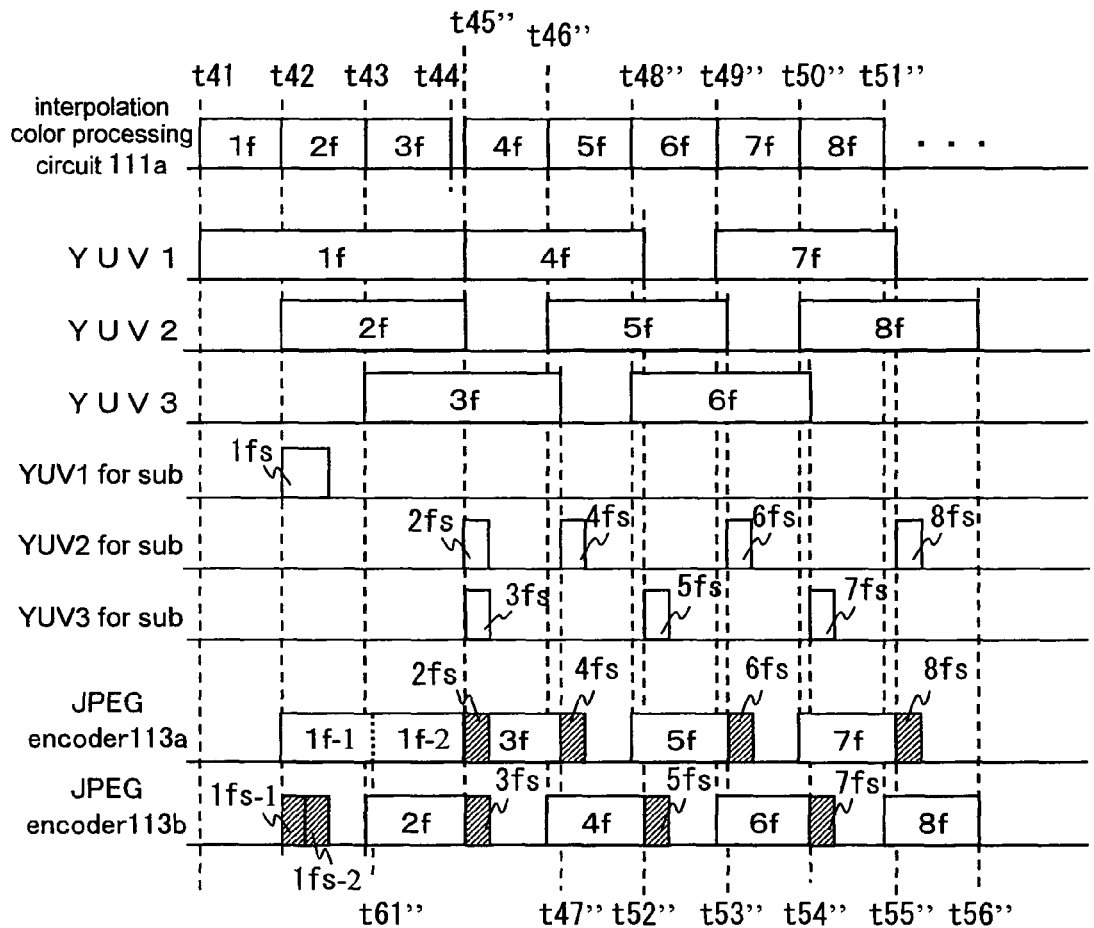
FIG. 13 is an explanatory diagram illustrating the Order of image processing of an image processing device according to a sixth embodiment.

Incidentally, an image compression processing time of an actual image illustrated in FIG. 13, for the sake of clarity, is illustrated to be the one that is shorter than the image compression processing time of each frame illustrated in FIG. 12 by a diagonally shaded area representing the compression processing time of a preview image. Further, in FIG. 13, a timing to which "'"' is added such as a timing t**" represents a timing a little different from the timing of a number to which "'"' is added or a number with no "'"' of FIG. 12. For example, while a timing t45 of FIG. 12 indicates a start time point of interpolation color processing of the fourth frame (4f), a timing t45", of FIG. 13 indicates a start time point of interpolation color processing of the fourth frame (4f), but is earlier than the timing t45 by the compression processing time of a preview image.

Figure 14:
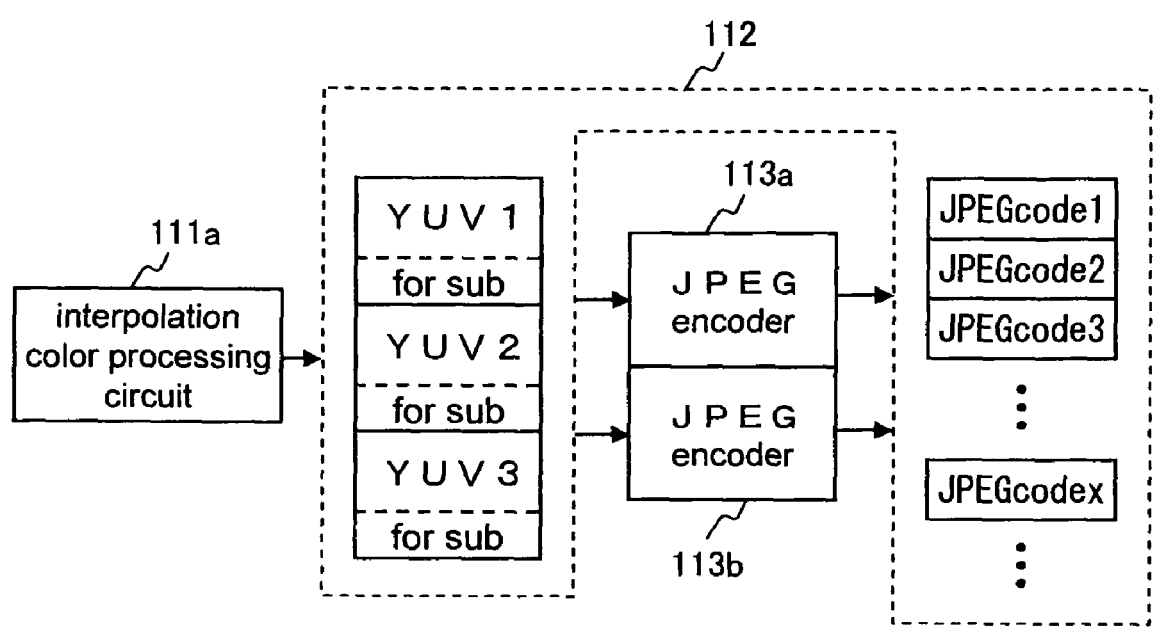
FIG. 14 is a block diagram of an image processing part when a preview image is included.

In addition, in this embodiment, as illustrated in FIG. 14, other than the buffers YUV1 to YUV3 for actual image processing, areas of sub-buffers YUV1 to YUV3 for preview image processing are secured in the memory 112. However, interpolation color processing of both an actual image and a preview image is performed using the buffers YUV1 to YUV3 for processing.

In FIG. 13, interpolation color processing of the first frame (1*f*) is performed using the buffer YUV 1 during a time of timings t41 to t42 at the interpolation color processing circuit 111*a*. When the interpolation color processing of the first frame (1*f*) finishes, the JPEG encoder 113*a*, using the buffer YUV1, performs the first compression processing (preliminary compression processing) on an actual image of the first frame (1*f*) using the scaling factor Sa of an initial value.

At the same time, the JPEG encoder 113*b*, using the sub-buffer YUV1, performs the first compression processing (preliminary compression processing) on a preview image of the first frame (1*f*) using the scaling factor Sd of an initial value, and based on the obtained code amount, estimates such a scaling factor that the code amount at the time when performing the next compression processing falls within a predetermined range and updates the scaling factor Sa. Furthermore, the JPEG encoder 113*b* performs the second compression processing on the preview image of the first frame (1*f*), and based on the code amount obtained at the second compression processing, estimates such a scaling factor that the code amount at the time when performing the next compression processing falls within a predetermined range and updates the scaling factor Sd.

The JPEG encoder 113*a*, based on the code amount obtained at the first compression processing of an actual image, estimates such a scaling factor that the code amount at the time when performing the next compression processing falls within a predetermined range and updates the scaling factor Sa. Further, the JPEG encoder 113*a*, at a timing t61", performs the second compression processing on an actual image of the first frame (1*f*), and based on the code amount obtained at the second compression processing, estimates such a scaling factor that the code amount at the time when performing the next compression processing falls within a predetermined range and updates the scaling factor Sa.

Similarly, interpolation color processing of the second frame (2*f*) is performed using the buffer YUV 2 during a time of timings t42 to t43 at the interpolation color processing circuit 111*a*. When the interpolation color processing of the second frame (2*f*) finishes, the JPEG encoder 113*b* performs image compression processing on the second frame (2*f*) using the buffer YUV2 during a time of timings t43 to t47.

In addition, the JPEG encoder 113*a* having finished the image compression processing of the first frame (1*f*) performs compression processing on a preview image of the second frame (2*fs*) using the scaling factor Sc, and based on the obtained code amount, estimates such a scaling factor that the code amount at the time when performing the next compression processing falls within a predetermined range and updates the scaling factor Sc.

Interpolation color processing of the third frame (3*f*) is performed using the buffer YUV3 during a time of timings t43 to t44 at the interpolation color processing circuit 111*a*. When interpolation color processing of the third frame (3*f*) finishes, the JPEG encoder 113*a* having finished the compression processing of a preview image of the second frame (2*fs*) performs image compression processing on the third frame (3*f*) using the scaling factor Sa with the use of the buffer YUV3 during a time of timings t45" to t47". Furthermore, the JPEG encoder 113*a*, based on the obtained code amount, estimates such a scaling factor that the code amount at the time when performing the next compression processing falls within a predetermined range and updates the scaling factor Sa. Here, although the interpolation color processing of the third frame (3*f*) has finished at the timing t44, the JPEG encoder 113*a* is performing the compression processing of a preview image of the second frame (2*fs*); so that waiting for the timing t45" at which this compression processing finishes, the JPEG encoder 113*a* performs compression processing on an actual image of the third frame (3*f*).

At the same time, the JPEG encoder 113*b* performs compression processing on a preview image of the third frame (3*fs*) using the scaling factor Sd, and based on the obtained code amount, estimates such a scaling factor that the code amount at the time when performing the next compression processing falls within a predetermined range and updates the scaling factor Sd.

Interpolation color processing of the fourth frame (4*f*) is performed using the buffer YUV1 during a time of timings t45" to t46" at the interpolation color processing circuit 111*a*. Here, at the timing t44 at which the interpolation color processing of the third frame (3*f*) finishes, the buffer YUV1 is being used for compression processing of an actual image of the first frame (1*f*), so that waiting for the timing t45, at which the buffer YUV1 is vacant, the interpolation color processing of the fourth frame (4*f*) is performed when the interpolation color processing of the fourth frame (4*f*) finishes at the timing t46", the JPEG encoder 113*b* performs compression processing on an actual image of the fourth frame (4*f*) using the scaling factor Sb. In addition, the JPEG encoder 113*b*, based on the obtained code amount, estimates such a scaling factor that the code amount at the time when performing the next compression processing falls within a predetermined range and updates the scaling factor Sb.

At the same time, the JPEG encoder 113*a*, waiting for a timing t47" at which compression processing of an actual image of the third frame (3*f*) finishes, performs compression processing on a preview image of the fourth frame (4*fs*) using the scaling factor Sc, and based on the obtained code amount, estimates such a scaling factor that the code amount at the time when performing the next compression processing falls within a predetermined range and updates the scaling factor Sc.

After that, similarly, while compression processing of an actual image from the fifth frame (5*f*) to the eighth frame (8*f*) is being performed, compression processing of a preview image from the fifth frame (5*fs*) to the eighth frame (8*fs*) is performed in parallel by a JPEG encoder different from that of the actual image.

In this way, in the camera 101*a* having the image processing device according to this embodiment, when performing compression processing on two kinds of different sizes of images having been continuously shot, the compression processing of an actual image of the same frame and the compression processing of a preview image of the same frame can be performed by parallel processing at different JPEG encoders, so that image compression processing can be performed at higher speed.

Incidentally, although in this embodiment, in compression processing of an actual image, the JPEG encoder 113*a* and the JPEG encoder 113*b* use independently the scaling factor Sa and the scaling factor Sb respectively, it is preferable that the scaling factor Sa and the scaling factor Sb are made to be one, and that both the JPEG encoder 113*a* and the JPEG encoder 113*b* use this scaling factor. Similarly, in compression processing of a preview image, although the JPEG encoder 113*a* and the JPEG encoder 113*b* use independently the scaling factor Sc and the scaling factor Sd respectively, it is preferable that the scaling factor Sc and the scaling factor Sd are made to be one, and that both the JPEG encoder 113*a* and the JPEG encoder 113*b* use this scaling factor. In addition, it is preferable that the scaling factor Sa, the scaling factor Sb, the scaling factor Sc and the scaling factor Sd of an actual image and a preview image are made to be one, and that both the JPEG encoder 113a and the JPEG encoder 113b use this scaling factor.

(Seventh Embodiment)

Figure 15:
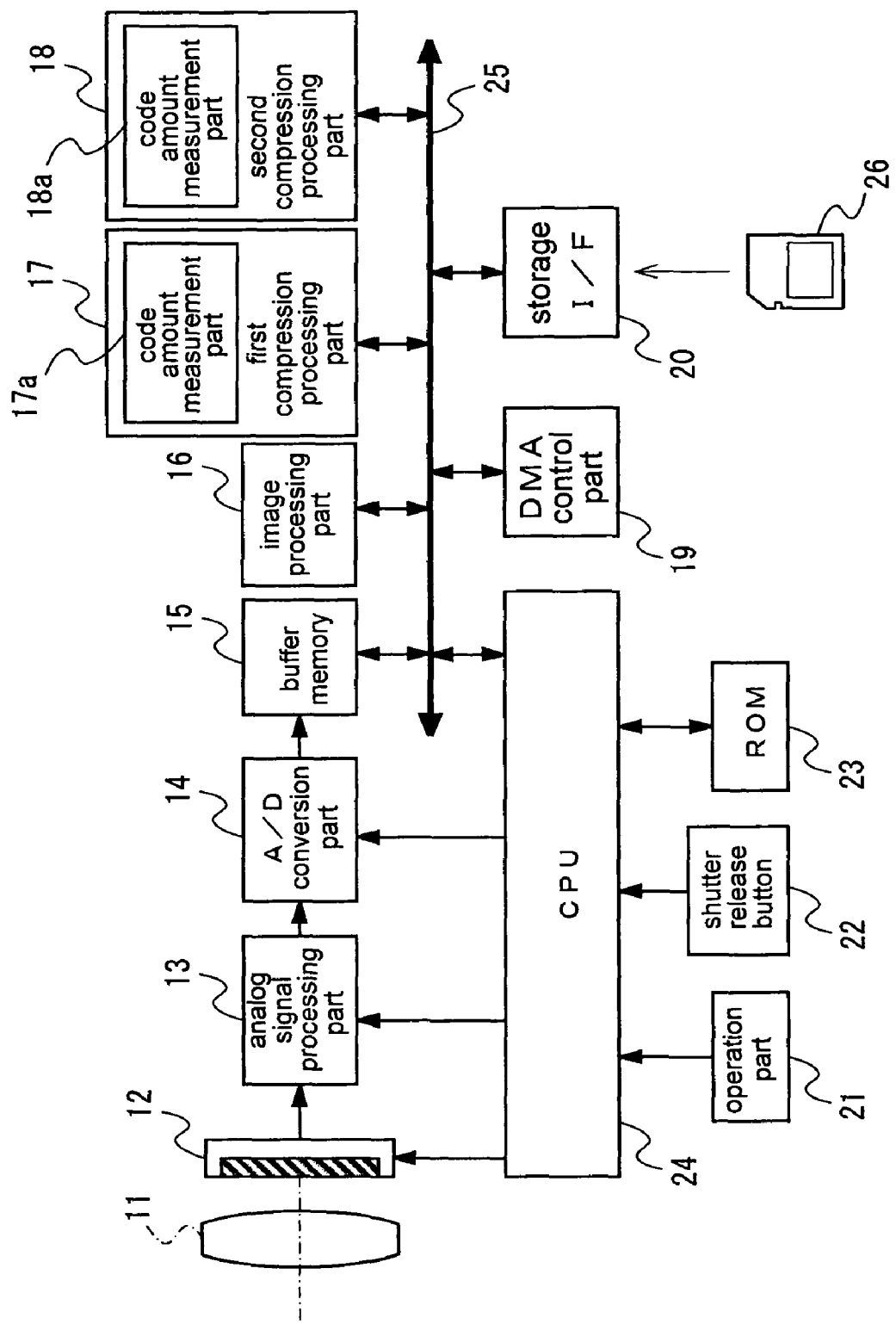
FIG. 15 is a block diagram of a configuration of an electronic camera according to a seventh embodiment.

Now, a camera having an image processing device according to a seventh embodiment will be described. FIG. 15 is a block diagram illustrating a configuration of an electronic camera according to this embodiment. The electronic camera includes a shooting optical system 11, an image sensor 12, an analog signal processing part 13, an A/D conversion part 14, a buffer memory 15, an image processing part 16, a first compression processing part 17 and a second compression processing part 18, a DMA (Direct Memory Access) control part 19, a storage I/F 20, an operation material 21 and a shutter release button 22, a ROM 23, and a CPU 24 and a system bus 25.

Here, the buffer memory 15, the image processing part 16, the first compression processing part 17, the second compression processing part 18, the DMA control part 19, the storage I/F 20 and the CPU 24 are coupled to each other through the system bus 25. This system bus 25 includes a plurality of data buses (in FIG. 15, illustration of individual data buses is omitted). Each of the image sensor 12, the analog signal processing part 13, the A/D conversion part 14, the operation material 21, and the shutter release button 22 and the ROM 23 is connected to the CPU 24.

The shooting optical system 11 is made up of a group of plural lenses having a zoom lens or a focusing-lens. Incidentally, for simplicity, FIG. 15 illustrates the shooting optical system 11 as one piece of lens.

The image sensor 12 is positioned on the image space side of the shooting optical system 11. This image sensor 12 shoots an image for storing (actual image) at the time of shutter release, makes a photoelectric conversion of a luminous flux having passed the shooting optical system 11 to generate an analog image signal. An output from this image sensor 12 is coupled to the analog signal processing part 13.

The analog signal processing part 13 is an analog front end circuit that performs analog signal processing on the output from the image sensor 12. The analog signal processing part 13 makes a correlation double sampling or an adjustment of the gain of an image signal. An output from this analog signal processing part 13 is coupled to the A/D conversion part 14.

The A/D conversion part 14 makes an A/D conversion of an image signal to be output from the analog signal processing part 13. An output from this A/D conversion part is coupled to the buffer memory 15.

The buffer memory 15 makes a buffering of data of an actual image to be output from the A/D conversion part 14. Furthermore, the buffer memory 15 temporarily stores the data of an actual image before and after compression processing.

The image processing part 16, with respect to the data of an image of one frame, performs various image processing (color interpolation processing, gray scale conversion processing, outline emphasis processing, white balance adjustment and the like).

The first compression processing part 17 is a processor for compressing the data of an actual image after image processing in JPEG (Joint Photographic Experts Group) type. This first compression processing part 17 includes in an internal part a code amount measurement part 17a of measuring the data amount of compression data.

Here, the first compression processing part 17 performs a series of compression processing as described below. First, the first compression processing part 17 performs DCT (discrete cosine transform) processing with respect to an image of a processing object to obtain a DCT coefficient. Incidentally, this DCT conversion is performed in each block of 8×8 pixels. Second, the first compression processing part 17, based on the below-described quantization table, performs quantization processing of the DCT coefficient. Third, the first compression processing part 17 performs Huffman encoding processing with respect to the quantized value and generates a compression data of an actual image.

The second compression processing part 18 is a processor of the same configuration as that of the above-mentioned first compression processing part 17, and includes in an internal part a code amount measurement part 18a. As to this second compression processing part 18, descriptions overlapped with those of the first compression processing part 17 will be omitted. Incidentally, the first compression processing part 17 and the second compression processing part 18 can make a fixed length compression of the data of an actual image of one frame in parallel processing.

The DMA control part 19, based on instructions of the CPU 24, controls a DMA transferring of the data of an image between modules in each data bus. That is, the DMA control part 19 can make a simultaneous data transferring to different modules in each data bus. Incidentally, the DMA control part 19 can invert the alignment order of data to be in the reverse order when transferring the data between modules.

At the storage I/F 20, formed is a connector for coupling a storage medium 26. Further, the storage medium I/F 20 conducts write/read of data with respect to the storage medium 26 that is coupled to the connector. The above-mentioned storage medium 26 is made up of e.g., a hard disk or a memory card containing therein a semiconductor memory. Incidentally, FIG. 15 illustrates a memory card as an example of the storage medium 26.

The operation material 21 is made up of, for example, a command dial, a cross cursor key, and a decision button. Further, the operation material 21 receives a variety of setting inputs of the electronic camera from a user. For example, a user can make (a) selection of a compression mode regarding a compression rate of an actual image (for example, "FINE", "NORMAL", or "BASIC") or (b) switching of a storage mode, using the operation material 21. Incidentally, in switching of the above-mentioned storage mode, a user can select a first storage mode of making a normal image processing or a second storage mode of storing RAW data (unprocessed image data).

The shutter release button 22 receives an instruction input of a shooting timing (start exposing of an actual image) from a user.

In the ROM 23, a sequence program for controlling the electronic camera, a standard quantization table, a scaling factor table and the like are stored. Here, in the standard quantization table, stored are numerical values of defining increments of quantization with respect to each DCT coefficient. Numerical values of this standard quantization table are set so as to reduce a large data amount of high frequency elements that would not be striking in visual performance of human kinds even if they are lost.

While, in the above-mentioned scaling factor table, as to a plurality of sample image data, each correspondence relationship between the value of a scaling factor at the time of compression processing (coefficient regarding a compression rate) and the amount of compression data is stored. Here, the value of the scaling factor table is obtained by repeating a compression processing while gradually changing the value of a scaling factor of each sample image data after DCT processing. Incidentally, with respect to data of the same image, the larger a scaling factor is, the higher the compression rate of data is.

The CPU 24 is a processor for making a centralized control of the electronic camera. The CPU 24 controls operations of each part of the electronic camera according to the above-mentioned sequence program.

Furthermore, the CPU 24 in this embodiment divides an actual image of one frame into two areas, as well as causing the first compression processing part 17 and the second compression processing part 18 to compress respective divided data of the actual image by parallel processing. In addition, the CPU 24, in respect of compression processing of the data of the actual image, makes a decision of a scaling factor, an operation of values of the quantization table and the like.

Hereinafter, image shooting operations of the electronic camera in this embodiment will be described. Incidentally, in the following example, descriptions will be made on the assumption of the state in which the electronic camera is set to be in the first storage mode by the operation of a user.

When the shutter release button 22 is fully depressed by a user, the CPU 24 drives the image sensor 12 to shoot an actual image. Image signals of the actual image having been read out from the image sensor 12 are passed through the analog signal processing part 13 and the A/D conversion part 14 by a pipeline method to be buffered in the buffer memory 15. Further, the data of the actual image is subjected to various image processing at the image processing part 16, and then stored again in the buffer memory 15.

Figure 16:
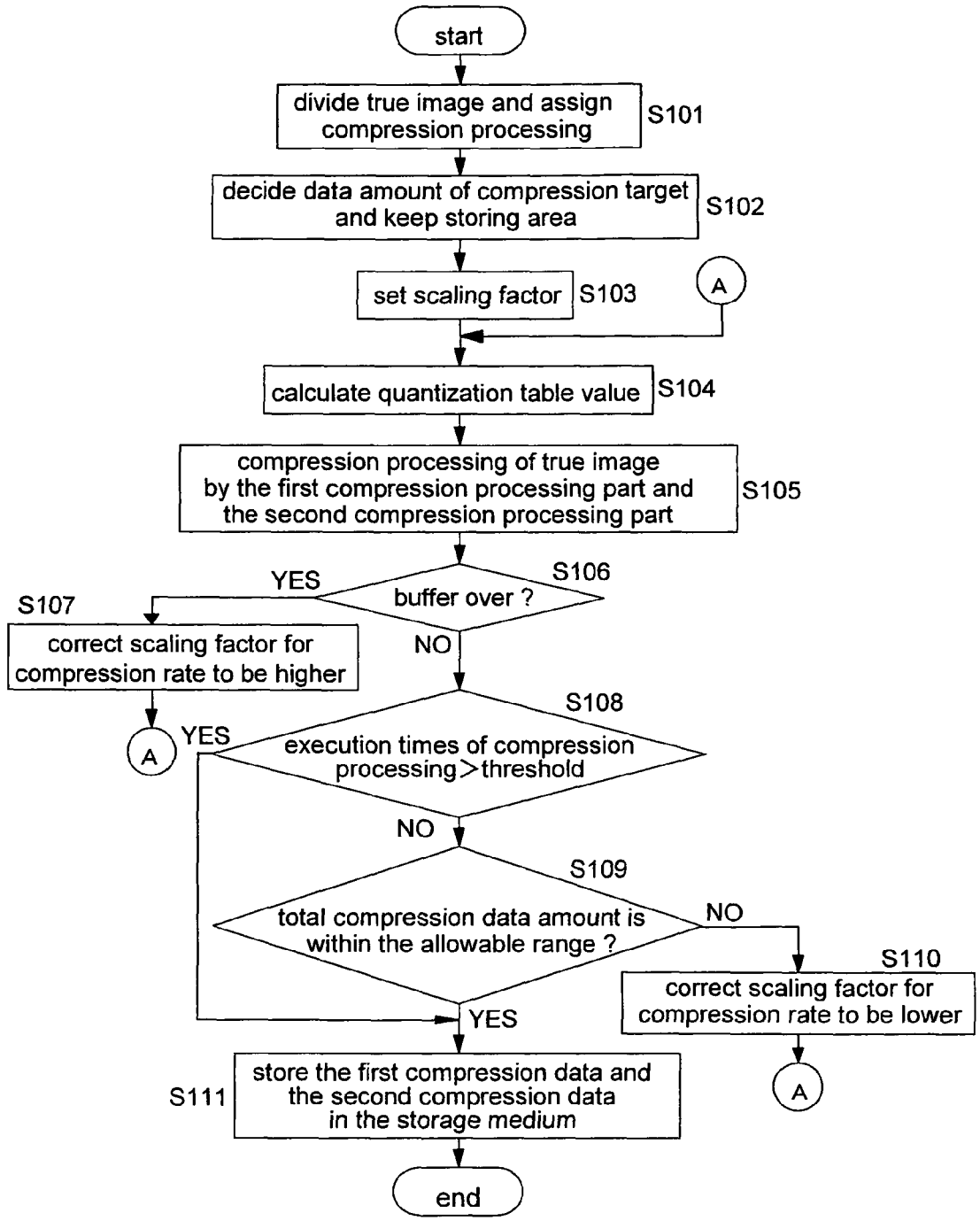
FIG. 16 is a flowchart illustrating compression processing of an electronic camera according to the seventh embodiment.

Furthermore, the CPU 24 causes the first compression processing part 17 and the second compression processing part 18 to perform compression processing for compressing the data of the actual image in a fixed length. Hereinafter, with reference to a flowchart of FIG. 16, compression processing in the electronic camera in this embodiment will be described in detail.

Step 101: The CPU 24 divides data of an actual image to be compressed into two areas, and assigns compression processing of the divided data to the first compression processing part 17 and the second compression processing part 18 respectively. In this embodiment, the CPU 24 divides the actual image into two upper and lower areas from a center line. Further, the CPU 24 assigns the compression processing of the upper half of the actual image to the first compression processing part 17 and assigns the compression processing of the lower half of the actual image to the second compression processing part 18.

Step 102: The CPU 24 decides the data amount of a compression target based on setting of a present compression mode. Furthermore, the CPU 24 secures a storing area of one frame corresponding to the data amount of the compression target in the buffer memory 15. Incidentally, in the storing area that is secured in this S102, the below-described first compression data and second compression data will be written.

Step 103: The CPU 24 refers to the scaling factor table of the ROM 23 and sets the scaling factor based on the data amount of the compression target (S102).

Step 104: The CPU 24 multiplies the value of the standard quantization table by the scaling factor to obtain the value of the quantization table for use in compression processing. Further, the CPU 24 outputs data of the value of the quantization table to each of the first compression processing part 17 and the second compression processing part 18. Thus, both the first compression processing part 17 and the second compression processing part 18 are to perform compression processing on the actual image based on the same value of the quantization table.

Step 105: The CPU 24 operates the first compression processing part 17, the second compression processing part 18 and the DMA control part 19 to perform compression processing on the data of the actual image. The compression processing in this S105 is performed by parallel processing at the first compression processing part 17 and the second compression processing part 18.

Figure 18:
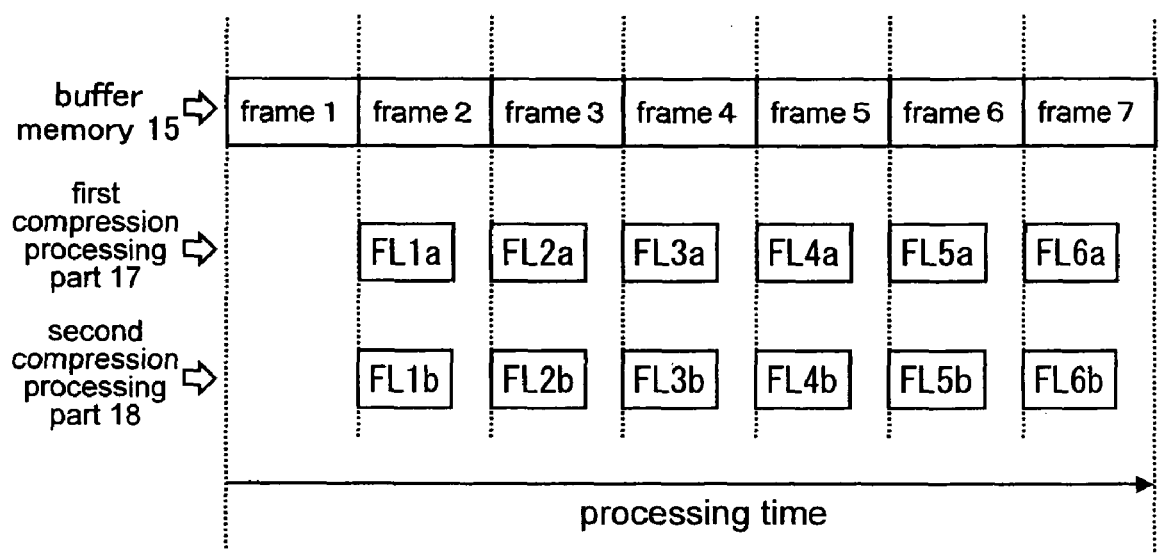
FIG. 18 is an explanatory diagram illustrating the order of image processing of an image processing device according to the seventh embodiment.

Here, the relationship between time and parallel processing of the first compression processing part 17 and the second compression processing part 18 will be described with reference to FIG. 18. FIG. 18 represents a passage of time in a horizontal axis direction, and illustrates situations of parallel processing of seven image frames to be written in the buffer memory 15 continuously over time at the first compression processing part 17 and the second compression processing part 18. First, after the first frame 1 is taken in the buffer memory 15, the first compression processing part 17 performs compression processing on an image of the upper half of the frame 1 taken in the buffer memory 15 (FL1$a$). Simultaneously, the second compression processing part 18 performs compression processing on an image of the lower half of the frame 1 taken in the buffer memory 15 (FL1$b$). Next, after the second frame 2 is taken in the buffer memory 15, the first compression processing part 17 performs compression processing on an image of the upper half of the frame 2 taken in the buffer memory 15 (FL2$a$). Simultaneously, the second compression processing part 18 performs compression processing on an image of the lower half of the frame 2 taken in the buffer memory 15 (FL2$b$). Subsequently, an image of the upper half of the third frame 3 is compressed by the first compression processing part 17 during a time of FL3$a$, and an image of the lower half of the third frame 3 is compressed by the second compression processing part 18 during a time of FL3$b$. After that, similarly, as is an image of the upper half of the fourth frame 4 compressed by the first compression processing part 17 during a time of FL4$a$, an image of the upper half of the fifth frame 5 is during a time of FL5$a$, an image of the upper half of the sixth frame 6 is during a time of FL6$a$, and an image of the upper half of the seventh frame 7 is during a time of FL7$a$; and as is an image of the lower half of the fourth frame 4 compressed by the second compression processing part 18 during a time of FL4$b$, an image of the lower half of the fifth frame 5 is during a time of FL5$b$, an image of the lower half of the sixth frame 6 is during a time of FL6$b$, and an image of the lower half of the seventh frame 7 is during a time of FL7$b$. Here, as illustrated in FIG. 18, since for example, the addition of the compression processing time FL1$a$ of the image of the upper half to be processed by the first compression processing part 17 and the compression processing time FL1$b$ of the image of the lower half to be processed by the second compression processing part 18 is longer than a time of taking in the image of the frame 2, if one compression processing part makes an image compression of one frame, this compression processing time exceeds the time of taking in the image of one frame, and thus image compression processing cannot be performed continuously over time. Whereas, in this embodiment, due to that an image of one frame is divided into an upper half and a lower half, and the image of the upper half is compressed by the first compression processing part 17 and the image of the lower half is compressed by the second compression processing part 18, image compression processing of one frame can be completed within the time of taking in the image of one frame.

Now, compression processing of data of an actual image at the first compression processing part 17 will be described.

Figure 17:
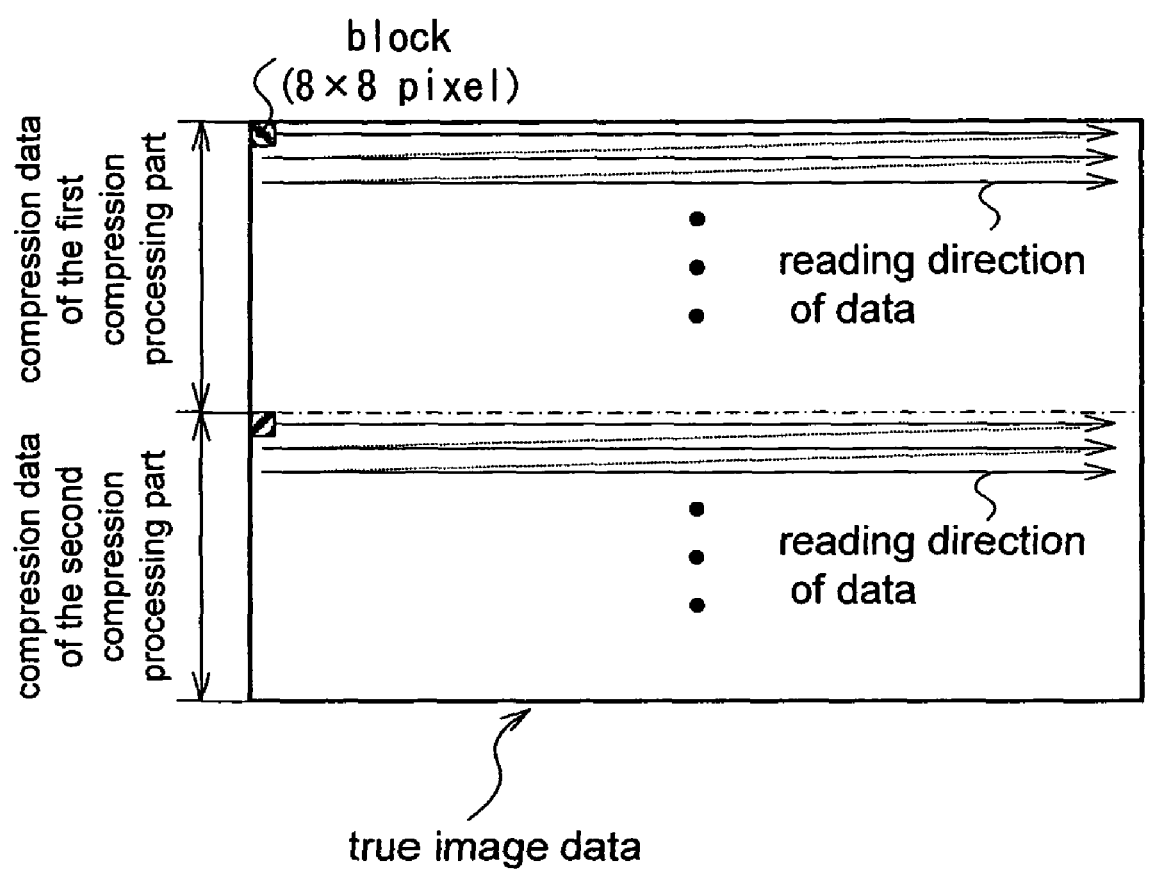
FIG. 17 is a schematic view illustrating a way of reading data of an image.

First, the DMA control part 19 makes a DMA transferring of data corresponding to the upper half of an image of the data of an actual image that is stored in the buffer memory to the first compression processing part 17. The DMA control part 19, letting the upper left side of the image of the upper half the starting point, sequentially reads out the data of the image for each block of 8×8 pixels. Incidentally, the DMA control part 19 makes readout in the order of the block at the left end to the block at the right end. Further, when finishing the readout of the block at the right end, the DMA control part 19 makes the same readout as mentioned above with respect to blocks horizontally aligned one stage lower. Incidentally, FIG. 17 schematically illustrates a readout method of the data of the image.

Second, the first compression processing part 17 performs compression processing on the data of the image of the upper half for each block to generate first compression data. In addition, the code amount measurement part 17a of the first compression processing part 17 sequentially outputs the data mount of the first compression data to the CPU 24.

Third, the DMA control part 19 makes a DMA transferring of the first compression data of a predetermined length as is in an output order to the storing area of the buffer memory 15 (S102).

Figure 19:
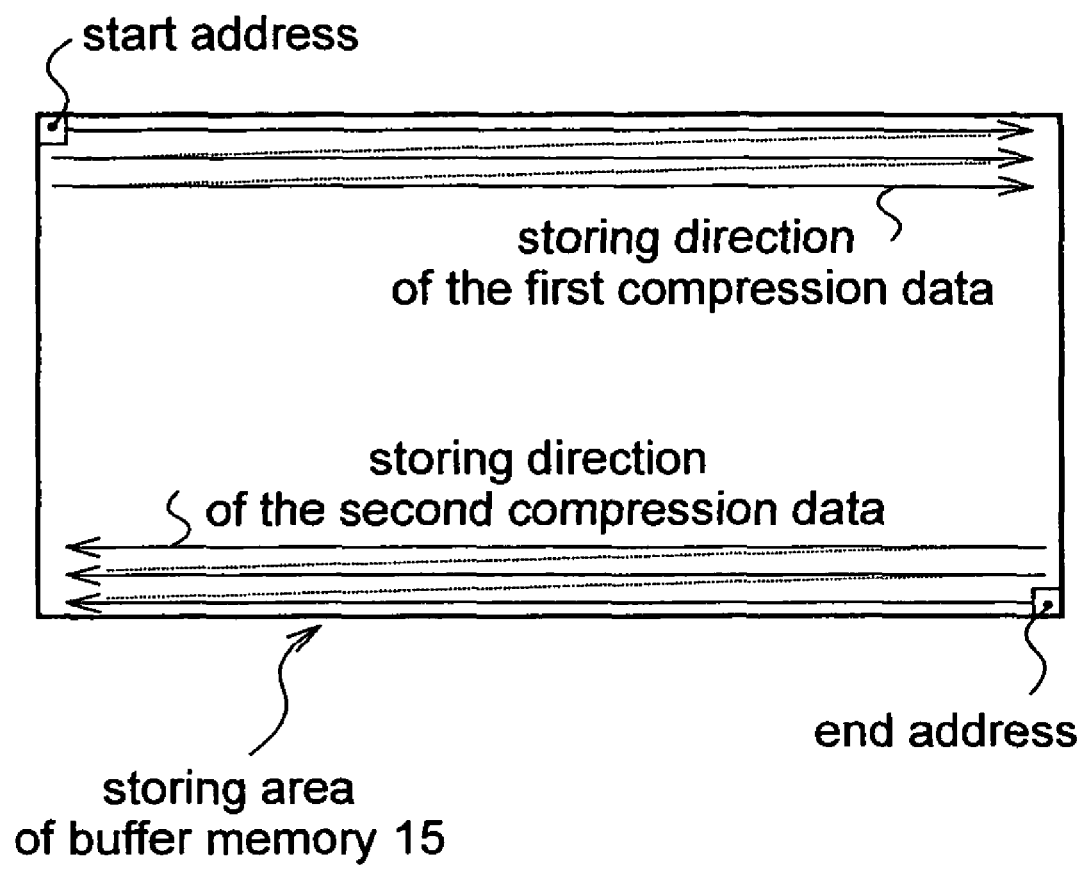
FIG. 19 is a schematic view illustrating a way of storing compression data.

Here, the DMA control part 19 starts storage of the first compression data from a start address of the storing area. Further, the DMA control part 19 sequentially makes an addition of storage address values of the start data at the time of DMA transferring of the first compression data. Whereby, the first compression data are to be sequentially stored in units of a predetermined length in a forward direction from the start address of the storing area. Incidentally, FIG. 19 schematically illustrates the storage method of a compression data.

Now, compression processing of the data of an actual image at the second compression processing part 18 will be described. Incidentally, the compression processing of the second compression processing part 18 is performed substantially at the same time in parallel with the above-mentioned compression processing of the first compression processing part 17.

First, the DMA control part 19 makes a DMA transferring of the data corresponding to the lower half of the image of the data of the actual image that is stored in the buffer memory 15 to the second compression processing part 18. The DMA control part 19, letting the upper left side of the image of the lower half the starting point, sequentially reads out the data of the image for each block of 8×8 pixels (refer to FIG. 17). Incidentally, the readout method of each block is the same as the above-mentioned case of the first compression processing part 17, so that duplicated description will be omitted.

Second, the second compression processing part 18 performs compression processing on the data of the image of the lower half for each block to generate second compression data. In addition, the code amount measurement part 18a of the second compression processing part 18 sequentially outputs the data amount of the second compression data to the CPU24.

Third, the DMA control part 19 makes a DMA transferring of the second compression data of a predetermined length to the storing area of the buffer memory 15 (S102).

Here, the DMA control part 19 starts storage of the second compression data from the end address side of the storing area. At this time, the DMA control part 19 inverts an alignment order of the second compression data at the time of DMA transferring, as well as making storage so that the most significant bit before inversion is positioned at the end address. Further, the DMA control part 19, at the time of DMA transferring of the second compression data, makes a sequential subtraction of a storage address value of the start data. Whereby, the second compression data is to be sequentially stored in units of a predetermined length in a reverse direction from the end address (refer to FIG. 19). Incidentally, when a total data amount of the first compression data and the second compression data is less than the capacity of the storing area (buffer size), there is produced a space area at an intermediate portion of the storing area. As an example, thought is the case in which a data string of "010111101" is output as the second compression data from the second compression processing part 18. The DMA control part 19 inverts the alignment order of the second compression data to transfer it to the buffer memory 15 as "10111010". The above-mentioned data string of "10111010" is stored so that the least significant bit is positioned at the end address of the storing area. Thus, when data is read out in the reverse direction from the end address of the storing area, the data string ("01011101") of the original second compression data is to be correctly output.

Step 106: The CPU 24, based on respective outputs from the code amount measurement parts 17a and 18a, determines whether or not a total amount of compression data (total of the first compression data and the second compression data) at the time of compression processing in S105 is over (buffer-over) the capacity of the storing area (S102).

When the total amount of compression data is over the capacity of the storing area (YES side), the CPU 24 goes to S107 for performing compression processing again. On the other hand, when the total amount of compression data falls within the capacity of the storing area (NO side), the CPU 24 goes to S108.

Step 107: The CPU 24, using any one of the following means (1) to (3), modifies a scaling factor so that the compression rate becomes higher. After that, the CPU 24 returns to S104 to repeat the above-mentioned operations.

(1) The CPU 24, in a stage in which the total amount of compression data is over the capacity of the storing area, causes the DMA control part 19 to stop transferring compression data. On the other hand, the CPU 24 causes the first compression processing part 17 and the second compression processing part 18 to compress the data of an actual image to the end to obtain the final total amount of compression data from the respective outputs of the code amount measurement parts 17a and 18a. In this case, the compression data after buffer over is used only for measurement of the code amount, and the compression data is not stored. Further, the CPU 24, based on the final total amount of compression data, obtains a scaling factor so that the data of the actual image falls within the data amount of compression target.

For example, the CPU 24, from the combination of the scaling factor this time and the final total amount of compression data, estimates a sample image data approximate to the actual image to be compressed. Then, the CPU 24 operates a scaling factor again using the scaling factor table corresponding to the estimated sample image data. In this case, based on compression results this time, the CPU 24 can estimate the scaling factor for use in the next compression with high accuracy.

(2) The CPU 24, in a stage in which the total amount of compression data is over the capacity of the storing area, causes the first compression processing part 17 and the second compression processing part 18 to stop all the compression processing. Then, the CPU 24, based on the respective outputs from the code amount measurement parts 17a and

18a, and the amount of the remaining data not having been compressed of the data of the actual image, obtains a scaling factor in the following procedure.

First, the CPU 24 obtains the data amount of the above-mentioned remaining data.

Second, the CPU 24, based on the respective outputs of the code amount measurement parts 17a and 18a, obtains respective data amounts of the first compression data and the second compression data that are stored in the storing area.

Third, the CPU 24 assumes that the remaining data is compressed as is the case of the first compression data and the second compression data, and estimates the amount of compression data of the remaining data.

In specific, the CPU 24, as to the remaining data corresponding to the upper half of the actual image, from the data amount of the image of the upper half having been compressed and the data amount of the first compression data, obtains an actual compression rate at the first compression processing part 17. Then, the CPU 24 obtains an estimate value of the amount of compression data by multiplying the data amount of the remaining data by the above-mentioned compression rate. Incidentally, the CPU 24, also as to the remaining data corresponding to the lower half of the actual image, obtains an estimate value of the amount of compression data in the same process as mentioned above.

Fourth, the CPU 24, from the addition of a total of the above-mentioned estimate values of the amount of compression data and the capacity of the storing area, obtains an estimate value of the final total amount of compression data. Then, the CPU 24, based on the estimate value of the final total amount of compression data, sets a scaling factor again so that the data of the actual image falls within the data amount of the compression target. Incidentally, operation of the scaling factor in this case is, as is the case of the above-mentioned (1), so that duplicated description will be omitted.

Also in this (2) case, based on compression results this time, the CPU 24 can estimate a scaling factor for use in the next compression with high accuracy. Incidentally, in the case of (2), compression processing needs not to be performed to the end, so that the CPU 24 can achieve a shorter processing time than in the case of the above-mentioned (1).

(3) The CPU 24, in a stage in which the total amount of compression data is over the capacity of the storing area, causes the first compression processing part 17 and the second compression processing part 18 to stop all the compression processing. Then, the CPU 24 obtains a scaling factor so that the remaining data not having been compressed can be compressed. As an example, when the case in which the ratio of the remaining data not having been compressed with respect to the entire data of an actual image is 1:4 is thought, the CPU24, as compared with the compression condition in S105, sets a scaling factor again so that the compression rate is increased to 125% ((4+1)/4). Incidentally, also in this case of (3), compression processing needs not to be performed to the end, so that the CPU 24 can achieve a shorter processing time than in the case of the above-mentioned (1).

Step 108: The CPU 24 determines whether or not the number of execution times of compression processing (S105) exceeds a threshold. When the number of execution times of compression processing exceeds the threshold (YES side), the CPU 24 goes to S111 to stop the compression processing with respect to the data of the actual image. On the other hand, when the number of execution times of compression processing is not more than the threshold (NO side), the CPU 24 goes to S109.

Step 109: The CPU 24 determines whether or not the total amount of compression data (S106) falls within a permissible range which upper limit is the data amount of the compression target. When the total amount of compression data falls within the permissible range (YES side), the CPU 24 goes to S111. On the other hand, when the total amount of compression data becomes below the permissible range (NO side), the CPU 24 goes to S110 for performing compression processing again.

Step 110: The CPU 24 modifies the scaling factor so that the compression rate becomes lower. In this case, the CPU 24, based on the data amount of the first compression data and the second compression data, obtains the capacity of the space area of the storing area. Then, the CPU 24 sets a scaling factor again so that the total amount of compression data is increased in accordance with the capacity of the above-mentioned space area. After that, the CPU 24 returns to S104 to repeat the above-mentioned operations.

Step 111: The CPU 24 stores the first compression data and the second compression data that are stored in the storing area of the buffer memory 15 in the storage medium 26. At this time, the DMA control part 19, based on the instruction of the CPU 24, transfers each compression data as follows.

First, the DMA control part 19 reads out the first compression data in a forward direction from the start address of the storing area to transfer it to the storage medium 26. Here, the first compression data is to be stored in the storage medium 26 as is in an output order from the first compression processing part 17.

Subsequently, at a time point when the readout of the first compression data finishes, the DMA control part 19 reads out the second compression data in a reverse direction from the end address of the storing area to transfer it to the storage medium 26. The alignment order of the second compression data after this transferring is in the state of the output order from the second compression processing part 18 as described above. Then, the first compression data and the second compression data are continuously stored in the storage medium 26 as one data string. Whereby, the compression data of the actual image of one frame is to be stored in the storage medium 26 in the state as is the case of compression using one compression processing processor. Up to this point, descriptions of image-shooting operations of the electronic camera according to this embodiment are finished.

Now, effects of this embodiment will be described. In the electronic camera according to this embodiment, the first compression processing part 17 and the second compression processing part 18 compress an actual image of one frame by parallel processing. Consequently, as compared with the case of compressing data of an image using one compression processing processor, higher-speed compression processing can be achieved in this embodiment.

Furthermore, in the electronic camera according to this embodiment, the first compression data of the first compression processing part 17 and the second compression data of the second compression processing part 18 are temporarily stored in a common storing area of the buffer memory 15. Thus, in this embodiment, the storage efficiency of a compression data into the buffer memory 15 can be increased. As an example, thought is the case in which the amount of compression code of one compression processing part is small and the amount of compression code of the other compression processing part is large. Here, if individual storing areas of the buffer memory 15 are assigned to the first compression processing part 17 and the second compression processing part 18, taking a worst case into consideration, the buffer size of individual storing areas needs to suit the case of a large code amount. That is, if respective storing areas of these compression processing parts are prepared, a buffer size larger than the data amount of the compression target will be required.

On the other hand, in the arrangement of using the common storing area at both of the compression processing parts as is this embodiment, if the amount of compression code of one compression processing part is small, by this amount, a larger amount of compression code of the other compression processing part can be stored. Thus, in this arrangement of this embodiment, securing the storing area of a size corresponding to the data amount of the compression target in the buffer memory 15 will suffice.

In particular, in the electronic camera according to this embodiment, the first compression data is stored in the forward direction from the start address of the storing area, while the second compression data is stored in the reverse direction from the end address of the storing area. Consequently, in the storing area, a space area is assembled at the intermediate portion sandwiched between the first compression data and the second compression data, so that a higher storage efficiency of compression data into the buffer memory 15 can be achieved.

Furthermore, in the electronic camera according to this embodiment, the second compression data is stored in the storing area with the alignment order thereof inverted. Thus, if the second compression data is read out in the reverse direction from the end address, the CPU 24 can read out the second compression data from the buffer memory 15 in the correct alignment order.

(Supplementary Matters of Embodiments)

(1) Compression processing in the present invention is not limited to the time of shooting image as is the above-mentioned embodiments. For example, in the above-mentioned embodiments, it is preferable that at the time of digitally developing RAW data having been image-shot in a second storage mode, the first compression processing part 17 and the second compression processing part 18 perform compression processing in parallel. Further, it is preferable that compression processing according to the present invention, in a computer having a plurality of processor cores, is performed as software by causing different processor cores to function as two compression processing parts.

(2) It is preferable that the image compression method according to the present invention is not limited to DCT conversion in conformity with JPEG standard, but conforms to the other known image compression method. For example, it is preferable that the first compression part 17 and the second compression part 18 according to this embodiment are in conformity with the standard of JPEG2000, and an actual image that is divided in tile units are subjected to wavelet transform processing in parallel.

(3) The division method of an actual image according to the present invention is not limited to the case in which an image is divided into two upper and lower areas horizontally, but can be varied without restraint. For example, it is preferable that an image is divided into two left and right areas vertically. Furthermore, it is preferable that when the first compression processing part 17 and the second compression processing part 18 perform compression processing in conformity with JPEG2000 standard, the compression processing of ROI (Region Of Interest) region is assigned to the first compression processing part 17 and the compression processing of the other region is assigned to the second compression processing part 18.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing device, comprising:
an interpolation color processing circuit receiving images of continuous frames to perform interpolation and color processing thereon;
a storage part cyclically storing images of a plurality of frames being processed or having been processed by the interpolation color processing circuit;
a plurality of image compression processing circuits reading images of frames having been processed by the interpolation color processing circuit from the storage part to perform image compression processing thereon, and being cyclically started up for each of the frames to perform parallel processing thereon; and
a compression data storage part storing compression data processed by the image compression processing circuits, wherein
the number of the image compression processing circuits is set equal to or greater than a round-up number of a calculation value of the following expression: (processing time of the image compression processing circuit for one frame)/(processing time of the interpolation color processing circuit for one frame).

2. An image processing device, comprising:
an interpolation color processing circuit receiving images of continuous frames to perform interpolation and color processing thereon;
a plurality of storage buffers storing a predetermined amount of data set in advance from the frames being processed by the interpolation color processing circuit, for each of the frames;
a plurality of image compression processing circuits reading processed data stored in the storage buffers for each image processing unit to perform image compression processing thereon and being cyclically started up each time when a first unit of the image processing units of the frame is read to perform parallel processing thereon; and
a compression data storage part storing compression data processed by the image compression processing circuit, wherein
the number of the image compression processing circuits is set equal to or greater than a round-up number of a calculation value of the following expression: {(processing time of the image compression processing circuit for one frame)−(processing time of data of the processing unit of the interpolation color processing circuit)}/(processing time of the interpolation color processing circuit for one frame).

3. An image processing device, comprising:
an interpolation color processing circuit receiving images of continuous frames to perform interpolation and color processing thereon;
a storage part cyclically storing images of a plurality of frames being processed or having been processed by the interpolation color processing circuit;
a plurality of image compression processing circuits reading images of frames having been processed by the interpolation color processing circuit from the storage part to perform image compression processing thereon, and being cyclically started up for each of the frames to perform parallel processing thereon;

a compression data storage part storing compression data processed by the image compression processing circuits;

a compression condition storage part storing at least one of a first compression condition used for image compression processing in the first image compression processing part and a second compression condition used for image compression processing in the second image compression part; and a compression control part controlling image compression processing of the first image compression processing part and the second image compression processing part, and compression condition storage processing in the compression condition storage part, wherein the plurality of the image compression processing circuits are configured with a first image compression processing part performing image compression processing on images of odd order frames of the continuous frames and a second image compression processing part performing image compression processing on images of even order frames of the continuous frames.

4. An image processing device, comprising:

an interpolation color processing circuit receiving images of continuous frames to perform interpolation and color processing thereon;

a plurality of storage buffers storing a predetermined amount of data set in advance from the frames being processed by the interpolation color processing circuit, for each of the frames;

a plurality of image compression processing circuits reading processed data stored in the storage buffers for each image processing unit to perform image compression processing thereon and being cyclically started up each time when a first unit of the image processing units of the frame is read to perform parallel processing thereon; and a compression data storage part storing compression data processed by the image compression processing circuit;

a compression condition storage part storing at least one of a first compression condition used for image compression processing in the first image compression processing part and a second compression condition used for image compression processing in the second image compression part; and a compression control part controlling image compression processing of the first image compression processing part and the second image compression processing part, and compression condition storage processing in the compression condition storage part, wherein the plurality of the image compression processing circuits are configured with a first image compression processing part performing image compression processing on images of odd order frames of the continuous frames and a second image compression processing part performing image compression processing on images of even order frames of the continuous frames.

5. The image processing device according to claim 3, wherein the compression control part sequentially updates and stores latest compression condition of the first and the second compression conditions in the compression condition storage part, sets the first compression condition used for image compression processing on a next frame in the first image compression processing part with reference to the latest compression condition stored in the compression condition storage part, and sets the second compression condition used for image compression processing on a next frame in the second image compression processing part with reference to the latest compression condition stored in the compression condition storage part.

6. The image processing device according to claim 3, wherein the compression control part stores the respective first and second compression conditions in the compression condition storage part separately, updates and sets the first compression condition used for image compression processing on a next frame in the first image compression processing part with reference to the first compression condition of a former frame stored in the compression condition storage part, and updates and sets the second compression condition used for image compression processing on a next frame in the second image compression processing part with reference to the second compression condition of a former frame stored in the compression condition storage part.

7. The image processing device according to claim 5, wherein the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and when the second image compression processing part performs image compression processing on a second frame image of the continuous frame images, controls the second image compression processing part so as to perform preliminary compression processing on the second frame image by using a predetermined initial compression condition, to set the second compression condition based on an amount of compression codes obtained from the result of the preliminary compression processing so that a final amount of the compression codes falls within a predetermined range, and to perform compression processing on the second frame image by using the set second compression condition.

8. The image processing device according to claim 6, wherein the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and when the second image compression processing part performs image compression processing on a second frame image of the continuous frame images, controls the second image compression processing part so as to perform preliminary compression processing on the second frame image by using a predetermined initial compression condition, to set the second compression condition based on an amount of compression codes obtained from the result of the preliminary compression processing so that a final amount of the compression codes falls within a predetermined range, and to perform compression processing on the second frame image by using the set second compression condition.

9. The image processing device according to anyone of claim 5, wherein
the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and
when the second image compression processing part performs image compression processing on a second frame image of the continuous frame images, controls the second image compression processing part so as to set the second compression condition based on an amount of compression codes obtained from the result of the preliminary compression processing on the first frame image so that a final amount of the compression codes falls within a predetermined range, and to perform compression processing on the second frame image by using the set second compression condition.

10. The image processing device according to claim 6, wherein
the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and
when the second image compression processing part performs image compression processing on a second frame image of the continuous frame images, controls the second image compression processing part so as to set the second compression condition based on an amount of compression codes obtained from the result of the preliminary compression processing on the first frame image so that a final amount of the compression codes falls within a predetermined range, and to perform compression processing on the second frame image by using the set second compression condition.

11. The image processing device according to claim 1, wherein
the storage part stores at least the number of the image compression processing circuits plus one frame.

12. The image processing device according to claim 4, wherein
the compression control part sequentially updates and stores latest compression condition of the first and the second compression conditions in the compression condition storage part,
sets the first compression condition used for image compression processing on a next frame in the first image compression processing part with reference to the latest compression condition stored in the compression condition storage part, and
sets the second compression condition used for image compression processing on a next frame in the second image compression processing part with reference to the latest compression condition stored in the compression condition storage part.

13. The image processing device according to claim 4, wherein
the compression control part stores the respective first and second compression conditions in the compression condition storage part separately,
updates and sets the first compression condition used for image compression processing on a next frame in the first image compression processing part with reference to the first compression condition of a former frame stored in the compression condition storage part, and
updates and sets the second compression condition used for image compression processing on a next frame in the second image compression processing part with reference to the second compression condition of a former frame stored in the compression condition storage part.

14. The image processing device according to claim 12, wherein
the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and
when the second image compression processing part performs image compression processing on a second frame image of the continuous frame images, controls the second image compression processing part so as to perform preliminary compression processing on the second frame image by using a predetermined initial compression condition, to set the second compression condition based on an amount of compression codes obtained from the result of the preliminary compression processing so that a final amount of the compression codes falls within a predetermined range, and to perform compression processing on the second frame image by using the set second compression condition.

15. The image processing device according to claim 13, wherein
the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and when the second image compression processing part performs image compression processing on a second frame image of the continuous frame images, controls the second image compression processing part so as to perform preliminary compression processing on the second frame image by using a predetermined initial compression condition, to set the second compression condition based on an amount of compression codes obtained from the result of the preliminary compression processing so that a final amount of the compression codes falls within a predetermined range, and to perform compression processing on the second frame image by using the set second compression condition.

16. The image processing device according to anyone of claim 12, wherein the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and when the second image compression processing part performs image compression processing on a second frame image of the continuous frame images, controls the second image compression processing part so as to set the second compression condition based on an amount of compression codes obtained from the result of the preliminary compression processing on the first frame image so that a final amount of the compression codes falls within a predetermined range, and to perform compression processing on the second frame image by using the set second compression condition.

17. The image processing device according to claim 13, wherein the compression control part, when the first image compression processing part performs image compression processing on a first frame image of the continuous frame images, controls the first image compression processing part so as to perform preliminary compression processing on the first frame image by using a predetermined initial compression condition, to set the first compression condition based on an amount of compression codes obtained from the result of the preliminary compression processing so that a final amount of the compression codes falls within a predetermined range, and to perform compression processing on the first frame image by using the set first compression condition, and when the second image compression processing part performs image compression processing on a second frame image of the continuous frame images, controls the second image compression processing part so as to set the second compression condition based on an amount of compression codes obtained from the result of the preliminary compression processing on the first frame image so that a final amount of the compression codes falls within a predetermined range, and to perform compression processing on the second frame image by using the set second compression condition.

* * * * *